(12) United States Patent
Deen et al.

(10) Patent No.: US 10,032,479 B2
(45) Date of Patent: Jul. 24, 2018

(54) FINGERPRINT-DEFINED SEGMENT-BASED CONTENT DELIVERY

(71) Applicant: NBCUniversal Media, LLC, New York, NY (US)

(72) Inventors: Robert Glenn Deen, Simi Valley, CA (US); Michael Shane Wilkinson, Nehall, CA (US); Braxton Paul Perkins, La Canada Flintridge, CA (US)

(73) Assignee: NBCUniversal Media, LLC, New York, NY (US)

( * ) Notice: Subject to any disclaimer, the term of this patent is extended or adjusted under 35 U.S.C. 154(b) by 451 days.

(21) Appl. No.: 14/170,180

(22) Filed: Jan. 31, 2014

(65) Prior Publication Data

US 2015/0221336 A1     Aug. 6, 2015

(51) Int. Cl.

| | |
|---|---|
| *G06F 17/00* | (2006.01) |
| *G11B 27/031* | (2006.01) |
| *G11B 27/10* | (2006.01) |
| *G11B 27/30* | (2006.01) |
| *H04N 5/765* | (2006.01) |
| *H04N 9/82* | (2006.01) |

(52) U.S. Cl.
CPC .......... *G11B 27/031* (2013.01); *G11B 27/102* (2013.01); *G11B 27/3045* (2013.01); *H04N 5/765* (2013.01); *H04N 9/8205* (2013.01)

(58) Field of Classification Search
None
See application file for complete search history.

(56) References Cited

U.S. PATENT DOCUMENTS

| | | | | |
|---|---|---|---|---|
| 6,289,165 | B1 * | 9/2001 | Abecassis | G11B 19/02 348/E5.105 |
| 6,337,683 | B1 * | 1/2002 | Gilbert | H04N 5/23238 345/418 |
| 6,415,031 | B1 * | 7/2002 | Colligan | H04N 7/1675 348/E7.056 |
| 6,504,990 | B1 * | 1/2003 | Abecassis | G11B 19/02 348/E5.105 |
| 6,889,383 | B1 * | 5/2005 | Jarman | G11B 27/105 348/E5.002 |
| 7,567,671 | B2 * | 7/2009 | Gupte | H04N 7/1675 380/239 |

(Continued)

OTHER PUBLICATIONS

Liu et al., "A survey of video encryption algorithms", Computers & Security, vol. 29, Issue 1, pp. 3-15, Feb. 2010, Elsevier Science Direct.*

*Primary Examiner* — Tyler Torgrimson
(74) *Attorney, Agent, or Firm* — Fletcher Yoder, P.C.

(57) ABSTRACT

Digital content, such as video, audio, multimedia, and similar files may be segmented at a determined frame resolution rate and analyzed to determine a fingerprint for each content segment. An identifier that uniquely identifies each content segment may be determined based on the fingerprint of the respective content segment. The identifier may be associated with data relating to the content segment and with one or more identifiers that uniquely identify other content segments of the content. The content segment identifiers may be used to construct a content segment sequencing representation that represents the playback of the content segments in playback order.

18 Claims, 14 Drawing Sheets

(56) References Cited

U.S. PATENT DOCUMENTS

| | | | | |
|---|---|---|---|---|
| 8,230,343 B2* | 7/2012 | Logan | ............... | G06F 17/30265 |
| | | | | 386/291 |
| 9,135,955 B2* | 9/2015 | Abecassis | ............... | G11B 27/11 |
| 9,734,867 B2* | 8/2017 | Huang | ................. | G11B 27/031 |
| 2006/0170778 A1* | 8/2006 | Ely | ...................... | G11B 27/031 |
| | | | | 348/207.99 |
| 2007/0091928 A1* | 4/2007 | Wee | ................. | H04L 29/06027 |
| | | | | 370/474 |
| 2008/0263450 A1* | 10/2008 | Hodges | ................ | G11B 27/034 |
| | | | | 715/723 |
| 2009/0313305 A1* | 12/2009 | Raichelgauz | ....... | G06F 17/3002 |
| 2012/0210221 A1* | 8/2012 | Khan | ................... | G11B 27/034 |
| | | | | 715/716 |
| 2013/0046873 A1* | 2/2013 | O | ...................... | H04N 21/4825 |
| | | | | 709/223 |
| 2013/0104177 A1* | 4/2013 | Kwan | ............... | H04N 21/8456 |
| | | | | 725/93 |
| 2014/0025836 A1* | 1/2014 | Gupta | ................ | H04N 21/8456 |
| | | | | 709/231 |
| 2015/0332321 A1* | 11/2015 | Raichelgauz | ...... | G06Q 30/0255 |
| | | | | 705/14.53 |

\* cited by examiner

FINGERPRINT-DEFINED SEGMENT-BASED CONTENT DELIVERY

BACKGROUND

The present invention relates generally to the field of digital content for the delivery of video, audio, and multimedia content, and more particularly to innovations for representing and managing digital content.

Current methods for representing and managing digital content, such as digital video content, stem from early techniques of converting linear tape and film content into digitally storable data. For example, a linear, contiguous stream of captured images may be converted to a digital representation of the images and then stored in a contiguous file (e.g., a video file) including a series of encoded blocks of data. To playback such a file (e.g., a video file), a rendering device reads the one or more files of the video file starting at the first encoded block of data, renders the data into an image, and then repeats the process until all of the data for the video has been read and rendered. Thus, playback may be an essentially linear process.

However, a contiguous video file may present challenges relating to video processing and editing, transport, and playback. For example, while only a portion of a video file may be edited, the entire video file is retranscoded after editing, which may increase and time and cost of editing the video file. Moreover, the editing process may involve either altering the original video data or creating one or more alternate versions of the video, which may increase the storage required. Further, because the video file is a contiguous data stream, the entire video file may be given to a post production/editing facility. Thus, restricting access to portions of the video file may be difficult or impossible.

Additionally, a contiguous video file may provide challenges in digital viewing systems configured to show content synchronized with coordinated content shown on one or more viewing devices. In particular, the playback devices may not be contextually aware of the video being rendered. That is, because the playback device renders the content in an essentially linear process, the content may be rendered without any contextual information. While some techniques have been utilized to attempt to synchronize coordinated content shown on a second device with content shown on a first device, these techniques oftentimes rely on time metrics that may become corrupted or uninterpretable in some situations due to skipped, lost, dropped, replayed, paused, or edited portions of the video stream.

It may therefore be desirable to develop a new method for representing digital content that does not treat digital video as contiguous blocks of data to be read and rendered. Additionally, there is a need for a system configured to synchronize content with coordinated content using contextual information of the video data.

BRIEF DESCRIPTION

The present invention provides novel techniques for content and coordinated content composition, delivery, and management designed to respond to such needs. In accordance with aspects of the invention, a method for editing digital content includes reading a master version of a content segment sequencing representation including an ordered sequence of a plurality of nodes. The ordered sequence of the plurality of nodes defines a playback order of a plurality of content segments, and each node of the plurality of nodes is associated with a respective content segment of the plurality of content segments. Additionally, each content segment of the plurality of content segments is created by segmenting a content file into the plurality of content segments at a predetermined frame resolution rate. The method also includes interpreting a user input and generating a second version of the content segment sequencing representation based at least in part upon the user input.

In accordance with another aspect of the invention, a system for editing content includes a content manager including data processing circuitry configured to receive a first content segment sequencing representation from a first content editor. The first content segment sequencing representation comprises an edited version of a first portion of a master content segment sequencing representation. The data processing circuitry is also configured to merge the first content segment sequencing representation with the master content segment sequencing representation.

The invention also provides a tangible, non-transitory computer-readable medium including executable code for obtaining a master content segment sequencing representation comprising an ordered sequence of a plurality of nodes. The ordered sequence of the plurality of nodes defines a playback order of a plurality of content segments, and each node of the plurality of nodes is associated with a respective content segment of the plurality of content segments. Additionally, each content segment of the plurality of content segments is created by segmenting a content file into the plurality of content segments at a predetermined frame resolution rate. The computer-readable medium also include executable code for encrypting one or more nodes of master content segment sequencing representation using a first data encryption scheme.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
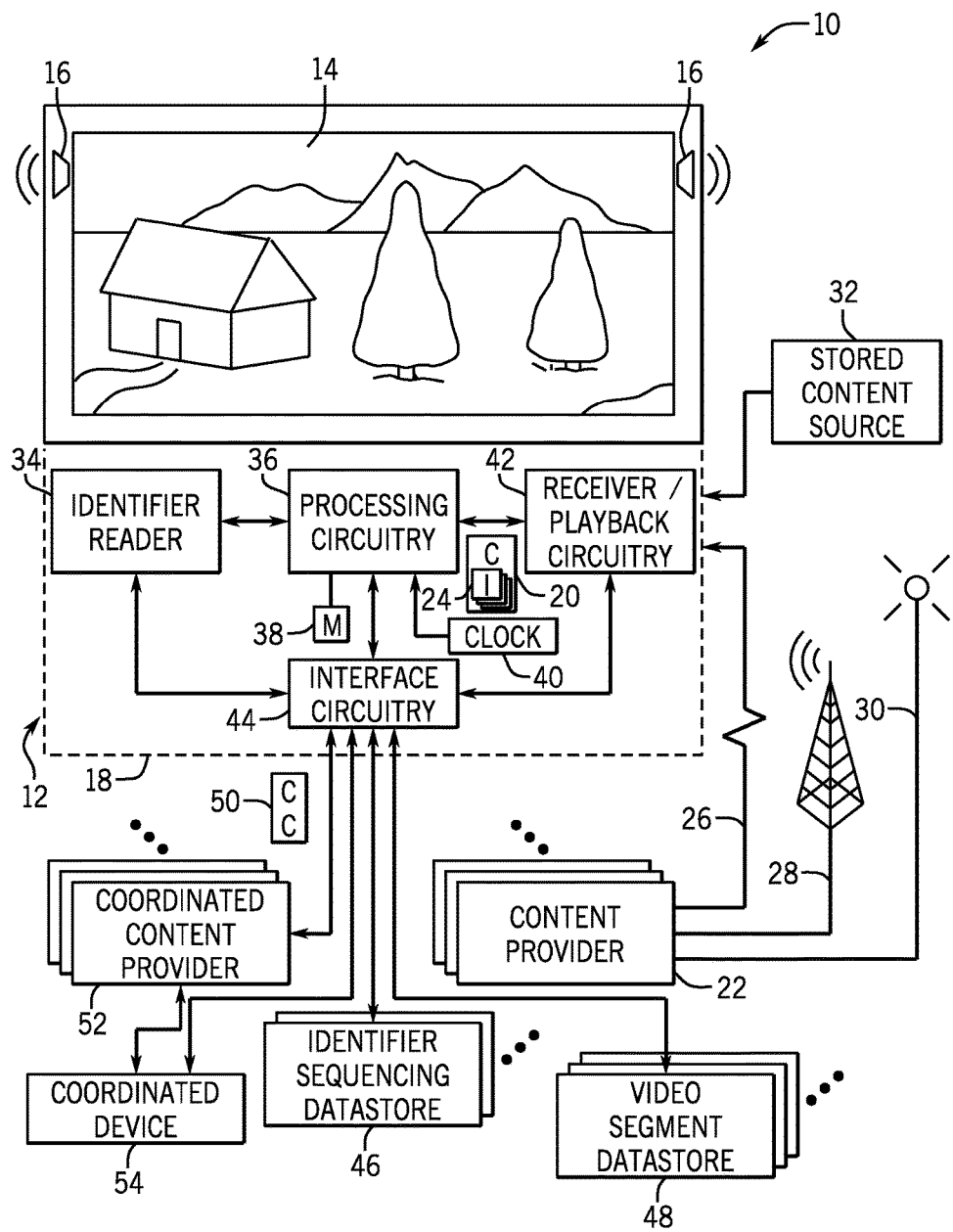
FIG. 1 is a diagrammatical representation of a content delivery system incorporating aspects of the present techniques.

Turning now to the drawings, FIG. 1 represents a content delivery system 10 which may manage and provide content and coordinated content that may be of interest to an audience. In particular, the system 10 may provide fingerprint-defined segment-based content, as will be described in more detail below. In general, the techniques described herein utilize segments of content, which may be segmented based on a desired frame/frame-set resolution rate and analyzed to produce a fingerprint for each content segment, and identifiers associated with the fingerprints of the content segments for dynamic composition of the content. For example, the system 10 may be configured to dynamically playback content by retrieving and rendering content segments based on a content render graph, which is a representation of the content in playback order.

The system 10 includes a media device 12 that maybe adapted for playing video, audio, or multi-media content. In practice, the media device 12 may be a television set, a collection of components including a television set, a computer with monitor, an audio-only playback system, a handheld device, a smart phone, or any other media device to which digital content is delivered and used by a user or a target audience. In the illustrated embodiment, the media device 12 includes a monitor 14 for providing still or moving pictures based upon the received content, as well as speakers 16 for providing audio output.

The illustrated media device 12 also includes a data processing system represented generally by reference numeral 18. The data processing system 18 may include multiple components as illustrated and described herein, or in certain embodiments such components may be provided in separate devices that are used in conjunction with the media device 12, although all these are generally taken into account in the use of the term media device in the present context. The data processing system 18 is designed to receive content 20 from one or more content providers 22 (e.g., content distribution systems). Again, this content 20 may include video, audio, multi-media, text, any other desired digital content, or any combination thereof. Further, in accordance with the present techniques, the content 20 may include fingerprint-defined segmented content. In otherwords, the content 20 may include one or more segments of content, determined based upon a particular frame/frame-set rate resolution, where each segment is associated with a digital fingerprint. Additionally, in certain embodiments, the content 20 may include one or more identifiers 24 corresponding to each segment's digital fingerprint that uniquely identify a respective fingerprint-defined content segment of the content 20. As will be described in more detail below, the identifiers 24 may be associated with and/or bundled with metadata associated with the fingerprint-defined content segments, metadata associated with the content 20, or any other desired information related to the content 20 or the delivery of the content 20. For example, an identifier 24 may be associated with a content segment and a second identifier associated with the next content segment for playback. The identifiers 24 may facilitate the management of the content 20 through production, post-production, storage, retrieval, and distribution, as well as facilitating the dynamic composition of the content 20.

The content providers 22 (e.g., content distribution systems), in turn, may include television broadcast companies, cable providers, satellite programming providers, Internet-based content providers, radio stations, or any other providers of digital content. Moreover, in the illustrated embodiment any one of a range of technologies may be used for delivering the content 20 to the media device 12. In the illustrated embodiment these include cable links 26, such as for cable television, Internet communications, and so forth, broadcast technologies as indicated by reference numeral 28, and satellite transmission technology as indicated by reference numeral 30. Other technologies may, of course, be employed, including cellular technologies, various wireless technologies, and so forth. It should also be noted, that the media device 12 may receive the content 20 from a wide range of other components, as indicated by reference numeral 32. These components may include stored content sources, such as disk readers, solid state memory, cloud computing services, third-party storage and/or playback systems, and so forth. In general, all of these sources may be capable of providing the content 20 that is played by the media device 12 at a known or unknown time. That is, some of the content may be scheduled, such as television programming, while other content may be viewed at a time that is shifted from a broadcast time slot, or even that corresponds to no particular schedule at all, such as in the case of delayed playback, playback of stored content, and so forth.

The data processing system 18, as described more fully below, is designed to read the identifiers 24 to provide the identifier 24 for a respective content segment and to dynamically playback content by rendering content segments based on a content render graph of identifiers indicating the desired order of the content segments for playback. That is, the system 10 may arrange video segments based upon an order of identifiers stored in the content render graph to dynamically construct a video stream. Thus, the system 10 may be configured to construct and render a video stream based on contextual information (e.g., the fingerprints of the video segments) rather than rendering a video stream in an essentially linear manner. It should be borne in mind that the system 10 may utilize any suitable techniques for indicating the desired playback order of the content segments and is not limited to a content render graph. For example, in other embodiments the system 10 may be configured to utilize a table, a relational database, a list, a graphical tool, tabulations, an algorithm, and so forth.

Thus, the data processing system 18 will include an identifier reader 34 configured to read each identifier 24 and any associated information bundled with and/or associated with the identifier 24. For example, the identifier 24 may be bundled/associated with the content segment that it uniquely identifies, metadata about the content segment, metadata about the content 20, and/or one or more identifiers associated with other content segments of the content 20. The identifier reader 34 may include any suitable software or hardware for reading the identifiers 24. The identifier reader 34 may also be configured to work in cooperation with processing circuitry 36 of the data processing system 18. The processing circuitry 36 in most cases will include some type of microprocessor, digital signal processor, or the like. The processing circuitry 36 performs functions, many of which may be beyond the scope of the present description. The processing circuitry may implement coding and decoding schemes used by the receiver/playback circuitry and so forth. The processing circuitry 36 may include, or separate memory circuitry may be provided as indicated by reference numeral 38. Moreover, the processing circuitry 36 may include, or a separate clock may be provided as indicated by reference numeral 40.

The processing circuitry 36 may construct the content render graph (or other content sequencing representation) based at least in part upon information received from the identifier reader 34. For example, in some embodiments, the identifiers 24 may be associated with (e.g., in a relational database) and/or bundled with a second identifier associated with the next content segment of the content 20. That is, each identifier 24 may provide information relating to the next content segment for playback. Thus, the processing circuitry may construct a content segment sequencing representation (e.g., the content render graph) such that each identifier 24 is associated with a particular content segment and an additional identifier pointing to the next content segment. As will be described in more detail below, the processing circuitry 36 may also construct the content render graph using information received from the identifier reader 34 in combination with business logic, metadata (e.g., transaction metadata), and so forth. In some embodiments, the media device 12 may receive the content render graph via a distribution stream (e.g., a terrestrial broadcast signal), which may be decoded by the processing circuitry 36 to determine the appropriate arrangement of the content segments for playback. The processing circuitry 36 may then direct receivers/playback circuitry 42 using the content render graph, which may play back the content segments in the order defined by the content render graph in accordance with generally known reproduction and playback techniques.

The data processing system 18 may also be designed to operate with external devices through interface circuitry 44. Such circuitry may be based upon any desired technology and protocols, such as Internet protocols, wireless protocols, telephony protocols, and so forth. As illustrated in FIG. 1, the interface circuitry 44 may be operatively coupled to an identifier sequencing datastore 46 that may store associated data for the identifiers 24. For example, the identifier sequencing datastore 46 may include a relational database, mass storage file system, web service, or the like, which may provide information such as the content segment uniquely identified by the identifier 24, one or more possible next identifiers associated with the identifier 24, metadata associated with the content 20, metadata associated with the content segment uniquely identified by the identifier 24, and so forth. In some embodiments, the identifiers 24 may not be bundled with a second identifier associated with the next content segment for playback. Thus, the processing circuitry 36 may be configured to receive information from the identifier sequencing datastore 46 to determine the next identifier associated with the next content segment in order to construct the content render graph. Furthermore, as will be described in more detail below, multiple content segments may be available for a particular portion of the content stream, such as, for example, standard definition content segments, high definition content segments, customer-specific content segments, content segments from different content sources, and so forth. Thus, the processing circuitry 36 may be configured to apply business logic or other algorithms to select the appropriate next identifier based on the available next identifiers associated with the identifier 24 stored in the node sequencing datastore 46. The identifier sequencing datastore 46 may include any suitable stored content sources, such as disk readers, solid state memory, cloud computing services, and/or third-party storage, and so forth. Further, in certain embodiments, the identifier sequencing datastore 46 may be incorporated into the media device 12, rather than external from the media device 12, as illustrated in FIG. 1.

The interface circuitry 44 may also be configured to receive information from one or more video segment datastores 48 that may each store a plurality of video segments. As noted above, multiple content segments may be available for a particular portion of the content stream. Accordingly, the video segment datastores 48 may store multiple versions of the content segments for the content 20, which may include versions with different playback resolutions, bit rates, color spaces, and so forth. In some instances (e.g., when the frame/frameset resolution of primary content is the same) the multiple versions may have similar digital fingerprints and/or identifiers. As will be described in more detail below, the processing circuitry 36 may be configured to apply business logic or other algorithms to select the appropriate content segment from the video segment datastore 48 for playback. Additionally, the processing circuitry 36 may also be configured to apply business logic or other algorithms to select the optimal video segment datastore 48 to retrieve the content segment. For example, the processing circuitry 36 may utilize and/or weight factors such as cost, responsiveness, reputation, network latency, the physical proximity of the video segment datastores 48 to the media device 12, and so forth. The video segment datastore 48 may include any suitable stored content sources, such as disk readers, solid state memory, cloud computing services, and/or third-party storage, and so forth. Further, in certain embodiments, the video segment datastore 48 may be incorporated into the media device 12, rather than external from the media device 12, as illustrated in FIG. 1.

Coordinated content 50 may also be provided based on the content 20. Such coordinated content 50 will originate in one or more coordinated content providers 52 which, in many practical applications may overlap with the content providers 22, or these may be separate entities. In certain presently contemplated embodiments, the coordinated content 50 may be intended to directly compliment the content 20, such as in the case of music, foreign language audio, or other content which is intended directly to be played simultaneously with the content 20. In other cases, the coordinated content 50 may be somewhat loosely linked to the content 20, such as to provide details regarding the content 20, additional information regarding plots, characters, actors, and the like, offers for additional information that may be of interest, sports scores and statistics, stock prices, product and service offerings, just to mention a few. In other contexts, the coordinated content 50 may simply be directed to the target audience based upon selection of the primary content type, as indicated by a geographic location of playback, a demographic drivable from the primary content or other information stored on the media device 12 or known about the audience, and so forth.

In some embodiments, the coordinated content 50 may be synchronized with the content 20 on the media device 12. Accordingly, the interface circuitry 44 may receive the coordinated content 50 from one or more of the coordinated content providers 36. Additionally or alternatively, the coordinated content 50 may be synchronized with the content 20 and delivered to a coordinated device 54. The coordinated device 54 may be a smart phone, a hand-held device, a television set, a computer with monitor, an audio-only playback system, or any other media device to which digital content is delivered and used by a user or a target audience. As will be described in more detail below, the processing circuitry 36 may control the synchronization of the coordinated content 50 by constructing a content segment sequencing representation (e.g., content render graph) incorporating nodes 56 of the coordinated content 50. By rendering content at the content segment level of granularity (e.g., at the frame/frameset resolution), the coordinated content 50 may be more tightly and dynamically synchronized to the content 20, as will be discussed in more detail below.

Figure 2:
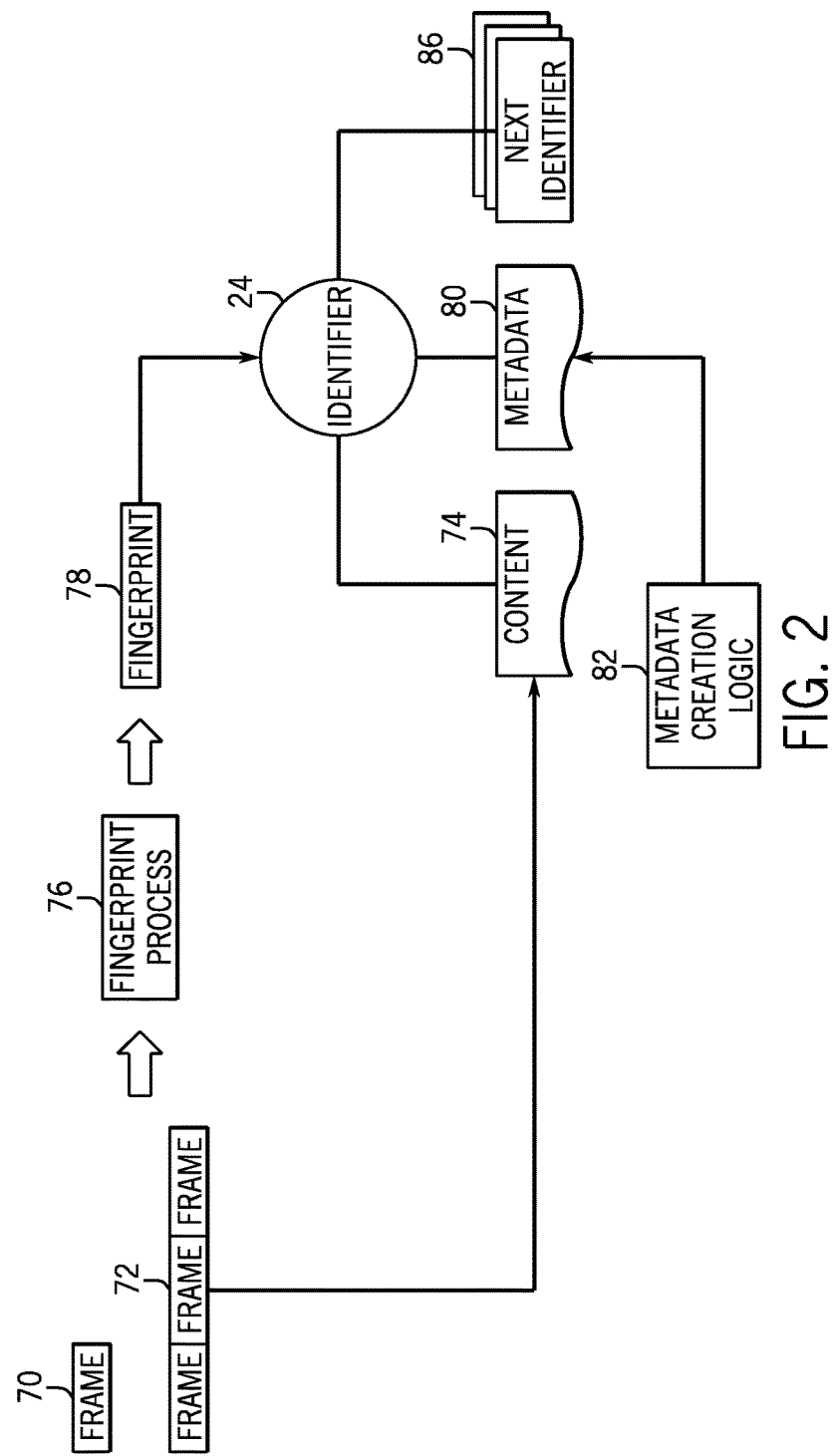
FIG. 2 is a diagrammatical representation of a possible scenario in which digital content may be segmented and associated with one or more identifiers.

FIG. 2 illustrates an example of a technique for segmenting the content 20 and distinctly identifying the content segments based on the digital fingerprints of the content segments to create the identifiers 24. While the illustrated example relates to video content, it should be noted that the present techniques may be applied to audio content or any other type of digital content to be delivered to a user. As illustrated in FIG. 2, the video content 20 may be analyzed at a particular frame/frameset resolution (e.g., a selected frame rate). For example, the video content 20 may be analyzed at individual frames 70 or at a set of contiguous frames 72 (e.g., a frameset). An individual frame 70 or a frameset 72 (e.g., every three frames, as depicted in the current embodiment) may define a content segment 74. The video content 20 may be analyzed as the content is being created or at a later time.

The individual frames 70 or the framesets 72 may then be analyzed by a fingerprint process 76 to produce and/or identify a fingerprint 78 for each individual frame 70 or frameset 72. Using the fingerprints of the content segments to distinctly identify each content segment may be desirable because the original content does not need to be modified in order to produce the fingerprints. That is, the fingerprints may uniquely identify the content without requiring that the content have elements or identifying features inserted into the content. Additionally, because the fingerprints do not require the content to have elements inserted into the content, the fingerprints may uniquely identify the content segments across various copies (e.g., versions) of the content, such as standard definition versions, high definition versions, and so forth. That is, the content segments of a standard definition version and the content segments of a high definition version may have the same fingerprints, if the standard and high definition versions are segmented at the same frame/frameset resolution rate. Furthermore, because the fingerprints 78 do not require embedding in the video content, the fingerprint process 76 may be altered or upgraded without needing to recode embedded data in the video content. The fingerprints 78 may also be resilient to transcoding and transformations of the video content. Thus, the fingerprints 78 may uniquely identify processed content segments 74. In scenarios in which the fingerprints 78 no longer uniquely identify the content segments 74 due to video processing, a new fingerprint may be mapped to the old fingerprint 78 because the fingerprints 78 are external to the video content, and thus are not altered by video processing.

The fingerprint process 76 may include any suitable software or firmware, executed on a computer processor, to create the fingerprints 78 or any other unique identifier derived from the individual frames 70 or framesets 72 as a whole or from part of the individual frames 70 or framesets 72. Thus, each fingerprint 78 may uniquely identify the respective individual frame 70 or frameset 72 (e.g., the content segment 74). It should be noted that in the present context, the features from which the fingerprints 78 are generated are considered unique and persistent identifiers of the content segments 74. That is, such features are part and parcel of the content and, when the content is present, so long as the same fingerprint generation algorithm is employed, will result in the same identifying data.

The identifier 24 may then be generated based on the fingerprint 78 of each content segment 74. In some embodiments, the identifier 24 may be the digital fingerprint 78 value directly. In other embodiments, the identifier 24 may be a single value or a digital object derived deterministically from the fingerprint 78 (e.g., via processing logic executed on a computer processor). In some embodiments, the identifier 24 may function as a lookup key to use with an information system, such as the identifier sequencing database 46, a relational database, a mass storage file system, a web service, or the like, which uses the identifier 24 as a key to lookup and retrieve data associated with the key. For example, a relational database may store data associated with the identifiers 24 in rows of tables in the relational database. In particular, each type of associated data (e.g., the content segment, metadata, the next identifier based on a set of business rules, the next identifier based on a different set of business rules, etc.) may be stored as a field in a table row, and the row may be indexed using the identifier 24 as the key. Thus, searches against the relational database using the identifier 24 as the key may return the rows of data associated with the identifier 24. In some embodiments, filtered searches may be performed by limiting the search to particular types of data associated with the identifier 24.

In other embodiments, a mass storage file system includes multiple file directories with each file directory named using an identifier 24. The file directories may store the data associated with the respective identifier. In some embodiments, each type of associated data may be contained within a separate file of the file directory. The identifier 24 may be used to select the file directory matching the identifier 24, and the associated data may then be accessed via the selected file directory.

In other embodiments, a web service may be utilized as the information system to store data associated with the identifiers 24. For example, the identifier 24 may be entered in the web service as a parameter in a URL, and the web service may return the data associated with the identifier 24. To filter or limit the results, a parameter indicating types of data of interest may be included in combination with the identifier 24 to return only the data of interest.

As illustrated in FIG. 2, the identifier 24 may be associated with the content segment 74 that it uniquely identifies. The identifier 24 may also be associated with metadata 80, which may be generated by a metadata creation logic component 82. The metadata 80 may be associated with the content 20, the content segment 74, and/or business factors, such as a customer account number, customer preferences, cost, and so forth. Additionally, the identifier 24 may be associated with one or more next identifiers 86, which may each uniquely identify a possible next content segment for playback. As will be described in more detail below, the processing circuitry 36 may be configured to determine the appropriate next identifier 86 from the one or more possible next identifiers 86. The identifier 24 may also be associated with the content 20, digital rights data, playback information data, viewer defined data, and/or identifiers from other content. In some embodiments, the identifier 24 may be associated with an extended content segment beginning with the content segment 74 used to determine the identifier 24 and extending onwards to include the next content segments of the content.

Figures 3, 4:
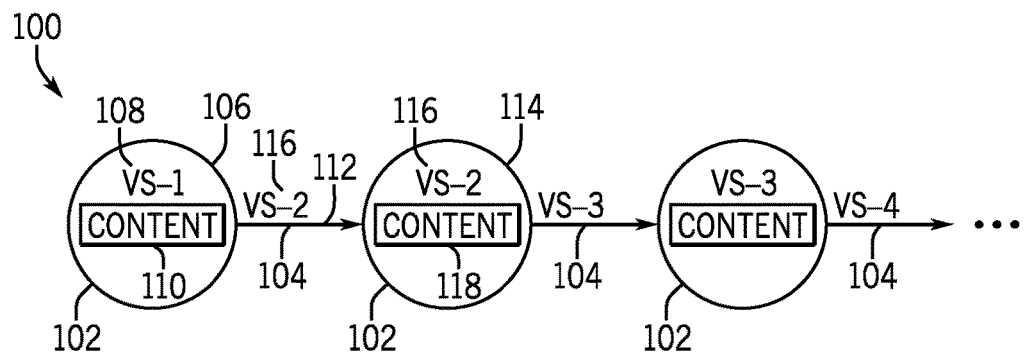
FIG. 3 is a diagrammatical representation of a content render graph for carrying out the present techniques.
FIG. 4 is a further diagrammatical representation of a table representation for carrying out the present techniques.

As noted above, the processing circuitry 36 may construct a content segment sequencing representation (e.g., a content render graph, sequencing table, or computer-rendered code) that is a representation of the content 20 in playback order, which may be used to direct the playback circuitry 42. In some embodiments, the content sequencing representation may be created in a dynamic manner (e.g., determining a number of subsequent segments as the content is presented) or statically (e.g., determining the entire sequence of segments prior to presenting the any of the content). FIG. 3 illustrates an example of a content render graph 100 that forms an ordered path expressing the entire content to be played back content segment by content segment. The content render graph 100 includes a plurality of nodes 102 and edges 104, which connect the nodes 102. Each node represents an identifier that uniquely identifies a content segment to be played back by the playback circuitry 42 in the order directed by the content render graph, while each edge represents an identifier that uniquely identifies the next content segment of the content render graph to be played back. For example, as noted above, the content segment represented by the node may be a video segment, such as one or more video scenes, an audio segment, such as an audio sequence, text, graphics, or any combination thereof. In certain embodiments, a node may represent a content segment sequencing representation (e.g., a content render graph). That is, a node may represent an ordered sequence of nodes and/or edges. The graph 100 may be generated based upon sequencing relationships provided to the processing circuitry 36. For example, as discussed above, in some embodiments, each node 102 may be a computer-readable object. The nodes 102 may include a reference to a subsequent node 102. This reference may be used to define the edges 104 pointing the subsequent node 102. In alternative embodiments, sequencing relationships may be provided by the identifier sequencing datastore 46.

As illustrated, the content render graph 100 includes a first node 106, which represents a first identifier 108 that uniquely identifies a first content segment 110. The first node 106 may direct the playback circuitry 42 using the first identifier 108 to play back the first content segment 110. The content render graph 100 also includes a first edge 112 that connects the first node 106 to a second node 114. The first edge 112 represents a second identifier 116, which uniquely identifies the next content segment for playback (i.e., the second content segment 118). Accordingly, the second node 114 represents the second identifier 116, which directs the playback circuitry 42 to play back the second content segment 118. The content render graph 100 may also include a third edge 120 representing a third identifier 122, which uniquely identifies the next content segment for playback (i.e., a third content segment), and so forth.

In some embodiments, the data processing system 18 may use an identifier of a node to retrieve and return the content segment associated with the identifier to enable playback. For example, in embodiments in which only the content render graph 100 is transmitted to the media device 12, the processing circuitry 36 may retrieve and return the desired content segments from the video segment datastore 48 based at least in part upon the identifiers 24 represented by the nodes 102 of the content render graph. Further, as will be described in more detail below, the processing circuitry 36 may execute various algorithms to determine which version of the content segment to deliver to the user, such as a standard definition content segment or a high definition content segment, and/or to determine an optimal source for the content segment. That is, while the content provider 22 may provide the content segments to the media device 12, the processing circuitry 36 may determine whether the provided content segments should be rendered by the playback circuitry 42 or whether an alternate content segment should be retrieved from one of the video segment datastores 48 for playback. Accordingly, in embodiments in which an alternate content segment is desired, the processing circuitry 36 and the interface circuitry 44 may coordinate the retrieval of the desired content segment from one of the one or more video segment datastores 48 using the nodes 102 and associated identifiers 24 of the content render graph 100.

As noted above, the system 10 may utilize any suitable techniques for indicating the desired playback order of the content segments and is not limited to the content render graph 100. For example, FIG. 4 illustrates an example of a table 130 that represents the content in playback order. As illustrated, the table 130 may include a first column 132 identifying the nodes 102 and a second column 134 identifying the edges 104. As described above with respect to FIG. 3, each node 102 represents an identifier that uniquely identifies a content segment to be played back by the playback circuitry 42 in the order directed by the table 130 (e.g., starting with the node 102 in the first row of the table 130), while each edge 104 represents an identifier that uniquely identifies the next content segment of the table 130 to be played back. For example, the table 130 includes a first node 136, which represents a first identifier that uniquely identifies a first content segment. The first node 136 may direct the playback circuitry 42 using the first identifier to play back the first content segment. The table 130 also includes a first edge 138 that is associated with the first node 136 and is stored in the same row of the table 130 as the first node 136. The first edge 138 represents a second identifier, which uniquely identifies the next content segment for playback. As illustrated, the value of the first edge 138 is used as a second node 140. The second node 140 represents the second identifier, which directs the playback circuitry 42 to play back the next content segment that is uniquely identified by the second identifier. The table 130 also includes a third edge 142 representing a third identifier, which uniquely identifies the next content segment for playback (i.e., a third content segment), and is used as a third node 144, and so forth.

Figure 5:
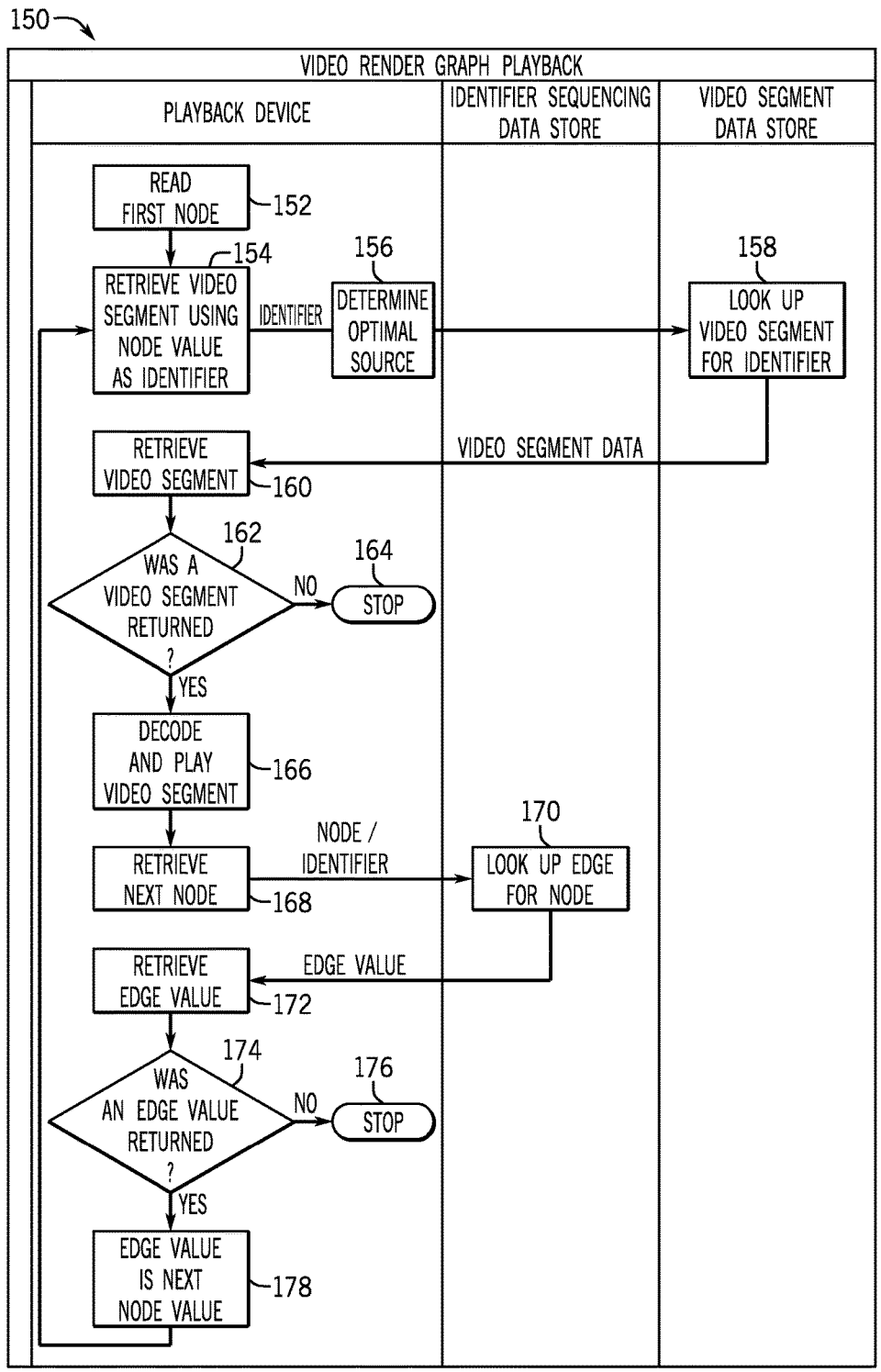
FIG. 5 is a diagrammatical representation of a process for the playback of content.

Turning now to a discussion of how the nodes and edges may be used for playback, FIG. 5 is a flowchart illustrating a process 150 for playing content (e.g., video and/or audio, text, images, etc.) on a client (e.g., the media device 12). A playback device (e.g., the media device 12) may read a first node (block 152). For example, the identifier reader 34 may read the first node from the content 20 and/or the processing circuitry 36 may read the first node from a content segment sequencing representation, such as a content render graph, a table, an algorithm, code, and so forth. The media device 12 may retrieve a video segment, or other digital content segment, using the first node as the identifier that uniquely identifies the video segment (block 154). In certain embodiments, the video segment may be transmitted to the media device 12 by the content providers 22. In other embodiments, the media device 12 may be configured to retrieve the video segment from the one or more video segment datastores 48. In such embodiments, the processing circuitry 36 may determine the optimal source to retrieve the video segment (block 156). While the illustrated embodiment shows that the processing circuitry 36 may determine the optimal source to retrieve the video segment (block 156), it should be noted that any suitable processing circuitry or processing device may be configured to determine the optical source to retrieve the video segment (block 156). For example, in certain embodiments, the media device 12 may be configured to use a subscription service and/or a value-add service that may be configured to determine the optimal source to retrieve the video segment (block 156) and may communicate the optimal source to the media device 12 and/or may return the video segment from the optimal source to the media device 12. As will be described in more detail below, to determine the optimal source from the one or more video segment datastores 48, the processing circuitry 36 (or another processing device) may be configured to consider factors such as cost, responsiveness, reputation, network latency, or physical proximity. After determining the optimal source, the media device 12 may search the selected video segment datastore 48 for the video segment using the identifier 24 as a key (block 158). The media device 12 may then retrieve the video segment from the video segment datastore 48 (block 160) and may determine whether the video segment was returned to the media device 12 (block 162). If the video segment was not returned, the process 150 may stop (block 164). If the media device 12 determines that the video segment was returned, then the playback circuitry 42 may decode and play the video segment (block 166). It should be borne in mind that the media device 12 may precache one or more video segments for faster playback.

The media device 12 may then retrieve the next node (e.g., identifier) associated with the next video segment for playback (block 168). In certain embodiments, the media device 12 may be configured to retrieve an edge associated with the first node in a content render graph or in a table. In other embodiments, the media device 12 may look up the edge (e.g., next identifier) for the first node in the identifier sequencing datastore 46 (block 170). As will be described in more detail below, in certain embodiments, multiple next identifiers or edges may be available for a node and may be stored with the node in the identifier sequencing datastore 46. In such embodiments, the processing circuitry 36 may be configured to determine the appropriate next identifier for the node using business logic or other algorithms. The media device 12 may retrieve the edge from the identifier sequencing datastore 46 (block 172) and may determine whether the edge was returned to the media device 12 (block 174). If the edge was not returned, the process 150 may stop (block 176). If the media device 12 determines that the edge was returned, then the processing circuitry 36 may use the edge as the next node value (block 178) and may retrieve the video segment using the node value as the identifier (block 154).

As noted above, the processing circuitry 36 and/or another processing device may be configured to determine the optimal source to retrieve the video segment. In some embodiments, the processing circuitry 36 may determine the optimal source to retrieve the video segment at each video segment retrieval. Because each video segment 74 has a persistent identifier 24 determined based on the fingerprint of the video segment, every instance of the same video segment 74 (i.e., the same content), regardless of the encoding, bit rate, resolution, or compression, will have the same persistent identifier 24. Thus, there may be multiple versions of each video segment 74 across multiple video segment datastores 48, which may be suitable for playback by the media device 12. This may be desirable, because it may enable the media device 12 to retrieve a higher quality video segment 74 (e.g., a higher resolution) and/or to retrieve a video segment 74 faster (e.g., over a faster, more responsive network) and/or at a lower cost (e.g., a less costly network).

Figure 6:
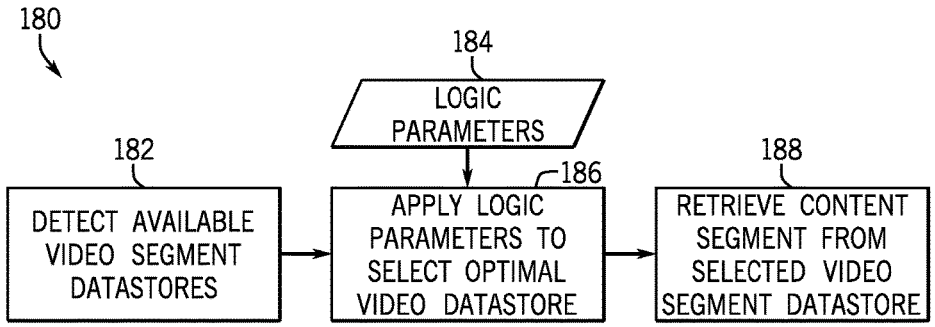
FIG. 6 is a diagrammatical representation of a process for retrieving content from a datastore.

FIG. 6 is a flowchart illustrating an example process 180 for determining the optimal source to retrieve the video segment. As noted above, the processing circuitry 36 and/or any other suitable processing circuitry or processing device may be configured to determine the optimal source to retrieve the video segment. The process 180 may include detecting available video segment datastores 48 (block 182). For example, detecting available video segment datastores 48 may include detecting one or more video segment datastores 48 stored in the cloud and/or detecting one or more video segment datastores 48 stored on other devices that are in proximity to the media device 12. The process 180 may also include applying logic parameters (block 184) to select the optimal video segment datastore from the available video segment datastores 48 (block 186). For example, the logic parameters (block 184) may include the responsiveness, reputation, network latency, bandwidth, effective range, and/or physical proximity of the one or more video segment datastores 48, the cost associated with retrieving the video segment 74 from the one or more video segment datastores 48, the bandwidth of the media device 12, and so forth. In some embodiments, the media device 12 may be configured to determine the logic parameters for one or more available video segment datastores. For example, in one embodiment, the media device 12 may be configured to determine the maximum bandwidth supported by one or more available video segment datastores. In some embodiments, the media device 12 may be configured to determine the optimal network option for the media device 12, such as a local-area network, a Bluetooth network, a Wi-Fi network, and so forth. In certain embodiments, the media device 12 may be configured to use the logic parameters in an algorithm to select the optimal video segment datastore 48. In one embodiment, the algorithm may weight one or more of the logic parameters. The media device 12 may then retrieve the video segment 74 from the selected optimal video segment datastore 48 (block 188).

Figure 7:
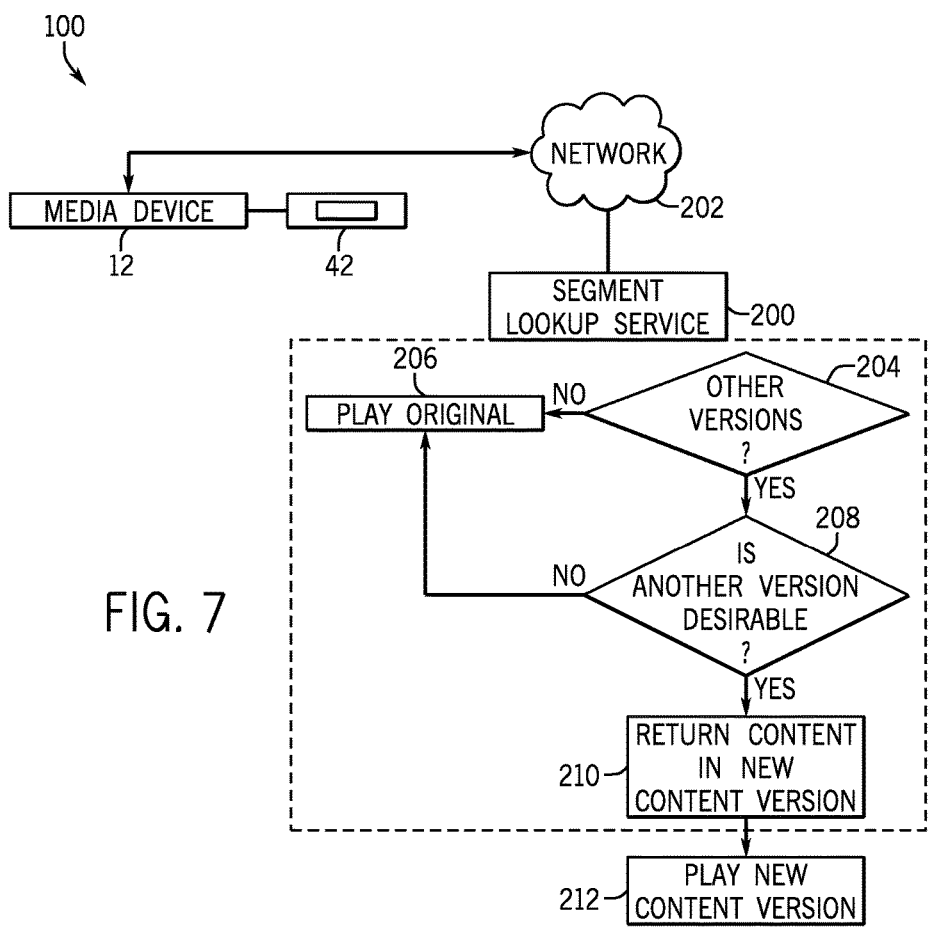
FIG. 7 is a diagrammatical representation of a system for retrieving content using a segment lookup service.

In certain embodiments, the system 10 may be configured to deliver a different (e.g., upgraded) version of one or more video segments 74 to the user by selecting a different version of the one or more video segments 74 from the one or more video segment datastores 48. For example, as illustrated in FIG. 7, the system 10 may include the media device 12, which may include and/or be operatively coupled to a playback device (e.g., the playback circuitry 42). In some embodiments, the media device 12 may be a TV that is configured to receive content, such as a standard definition version of a video on a VHS tape, broadcast content, and so forth. The media device 12 may also be configured to segment the video into a plurality of video segments, analyze the video segments to determine a fingerprint for each video segment, and determine an identifier for each video segment based on the fingerprint, as described above with respect to FIG. 2. However, it should be noted that in some embodiments, the media device 12 may receive one or more content segments, one or more identifiers uniquely identifying the one or more content segments, and/or a content segment sequencing representation. The media device 12 may then access a segment lookup service 200 to search for and/or retrieve upgraded video segments from the segment lookup service 200. In certain embodiments, the media device 12 may access the segment lookup service 200 via a network 202 (e.g., the internet, a local-area network, a Bluetooth network, a Wi-Fi network, etc.). In other embodiments, the segment lookup service 200 may be stored in or otherwise operatively coupled to the media device 12.

The media device 12 may retrieve upgraded video segments (e.g., a high definition version or a better quality version) from the segment lookup service 200 using the determined identifiers for the video segments. The media device 12 may be configured to dynamically replace content with upgraded content in real time and/or as an off-line pre-process step. In certain embodiments, the media device 12 may be configured to determine whether one or more other versions of the video segments are stored in and/or are available using the segment lookup service 200 (block 204). If the media device 12 determines that no other versions of the video segments are available, the media device 12 may playback the original video segments (e.g., the video segmented and analyzed by the media device 12) (block 206). However, if the media device 12 determines that other versions of the video segments are available, the media device 12 may then determine whether another available version of one or more of the video segments is desirable (block 208). For example, the media device 12 may be configured to determine whether the one or more available versions of the video segments are of better quality and/or resolution than the original video segments. In certain embodiments, the media device 12 may determine whether the one or more available versions of the video segments are compatible with the media device 12 for playback. Further, in some embodiments, the media device 12 may determine whether the one or more available versions of the video segment are geographically compatible (e.g., geo-compatible) with the location of the media device 12 and/or a customer location associated with a customer account. For example, certain countries may ban or censor certain videos or video segments. Thus, if a customer provides a censored version of a video to the media device 12, the media device 12 may be configured to analyze the available video segments for video segments that are geographically compatible such that censored portions of the video are not retrieved. In some embodiments, the media device may determine that the available versions are not desirable in response to a determination that the available versions are not compatible with the media device 12, are not geographically compatible, and/or are not of better quality/resolution than the original video segments. For example, if the content is playing on a standard-definition television, a high-definition version of the content might not be desirable, because transmission of the high-definition version may use more transmission bandwidth, while no benefit from higher definition content is provided by playback on the standard-definition television. If the media device 12 determines that the available versions are not desirable, the media device 12 may playback the original video segments (block 206).

However, if the media device 12 determines that one or more of the available versions may be desirable (e.g., compatible with the media device 12 and of better quality/resolution than the original video segments), the media device 12 may return the new version of the video segments using the segment lookup service 200 (block 210). In certain embodiments, the media device 12 may be configured to select an optimal version from one or more available and desirable versions of the video segments. The media device 12 may then playback the new version of the video segments returned using the segment lookup service 200 (block 212).

Figure 8:
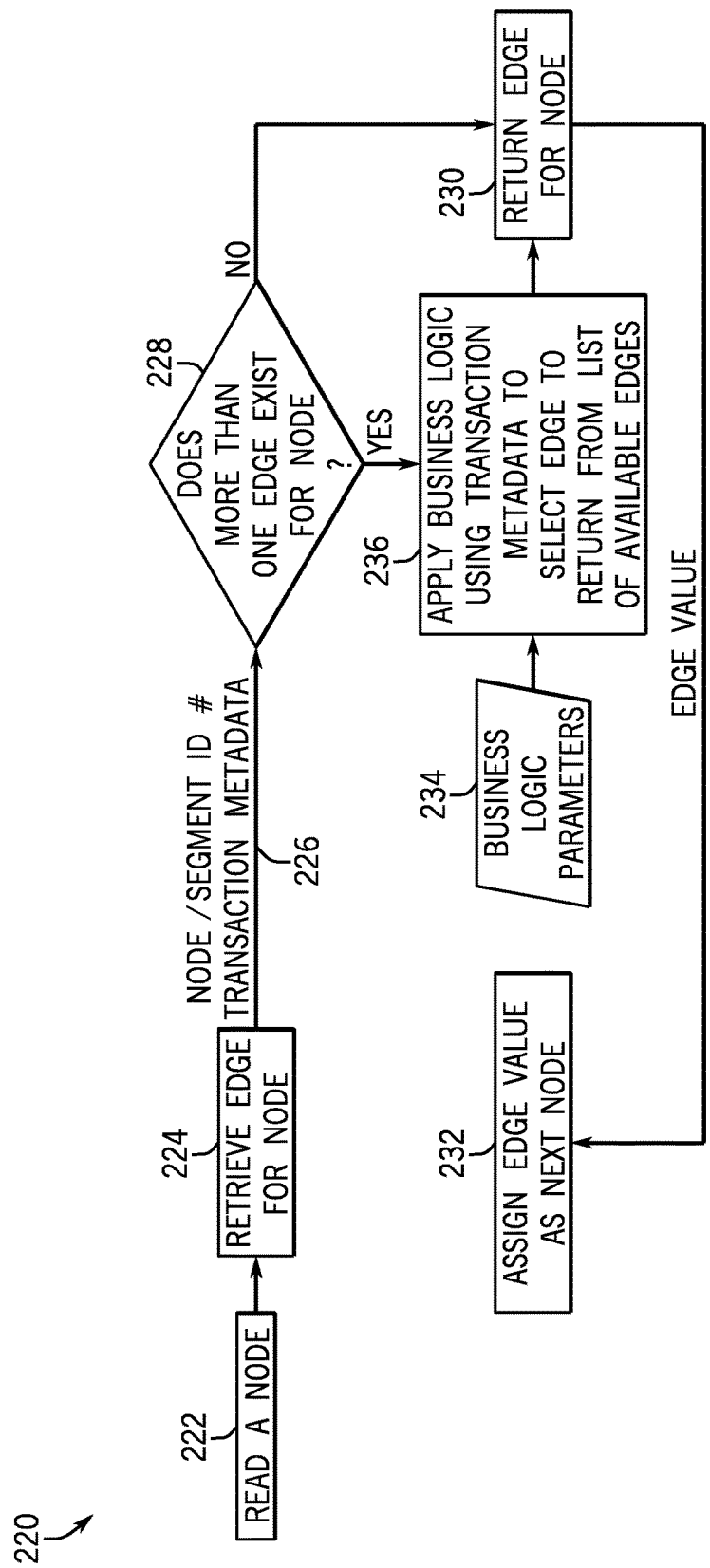
FIG. 8 is a diagrammatical representation of a process for the playback of content.

In addition to selecting an optimal video segment datastore 48 for retrieval of the video segment 74 and dynamically upgrading the video segments 74 to a higher quality version, the system 10 may also be configured to dynamically compose content by selecting which video segments 74 to retrieve for playback. In particular, multiple identifiers or edges may be available for a particular identifier or node, and the processing circuitry 36 and/or circuitry of the one or more identifier sequencing datastores 46 may be configured to determine the appropriate next identifier for the node using business logic or other algorithms. For example, FIG. 8 is a flowchart illustrating an example process 220 for dynamically composing content by incorporating transaction metadata for the content segments 74, the identifiers 24, and/or the nodes 102. The process 220 may be performed in real-time (e.g., at playback time) or may be performed prior to playback. In particular, the process 220 may describe an example of the process for looking up an edge for a given node (block 170), as described in FIG. 5. The process 220 may also include additional steps from the process 150, as described in FIG. 5, such as reading the first node (block 152), retrieving the video segment using the node value as the identifier (block 154), decoding and playing the video segment (block 166), and so forth.

For example, the process 220 may include reading a node (block 222). The media device 12 may read the node from the content 20, as described above with respect to FIG. 5, from a content segment sequencing representation, and/or from a determined edge value (e.g., using the determined edge value as the node value). The process 220 may also include retrieving an edge associated with the node (block 224). In certain embodiments, the media device 12 may retrieve the edge associated with the node (e.g., identifier) from one of the one or more identifier sequencing datastores 46. The node may bundled with or otherwise associated with transaction metadata 226 relating to the content segment associated with the node, the user (e.g., a customer ID/account number, customer preferences, customer location, and so forth), the media device (e.g., type, model, ID, manufacturer, and so forth), the network provider, the retrieval transaction, and/or any special offer identifiers. For example, the transaction metadata 226 relating to the content segment associated with the node may include information such as, the quality of the content segment (e.g., high definition, standard definition, etc.), the color depth (e.g., bit depth) of the content segment, the audio bit depth of the content segment, a rating of the content segment (e.g., G, PG, PG-13, R, M, NC-17, etc.), one or more countries that the content segment is geographically compatible with, the duration of the content segment, information relating to the subject matter and/or storyline of the content segment, information identifying the content segment as an advertisement, information identifying the content segment as including premium content, or any other suitable information. Additionally, the transaction metadata 226 may include information relating to prior nodes of the content segment sequencing representation and/or previously (e.g., recently) played back content segments. For example, the media device 12 may be configured to store information relating to which nodes and/or content segments of the content segment sequencing representation have been retrieved and/or played back. Further, in certain embodiments, the transaction metadata 226 may include rules and/or comments created by one or more entities involved during the production and/or editing of the content segments, such as a producer or a director.

The process 220 may also include determining whether more than one edge is available for the node (block 228). Determining whether more than one edge is available for the node may include searching one or more of the identifier sequencing datastores 46 using the node to retrieve available edges associated with the node. If only one edge is available for the node, the media device 12 may return the edge for the node from the identifier sequencing datastore (block 230) and may assign the edge value as the next node value (block 232). As described above with respect to FIG. 5, the next node value may then be used to retrieve the content segment associated with the node (block 154), and the media device 12 may play back the retrieved content segment (block 166).

However, if the media device 12 and/or circuitry of the one or more identifier sequencing datastores 46 determines that more than one edge is available for the node, the media device 12 and/or circuitry of the identifier sequencing datastore 46 may input business logic parameters (block 234) to apply business logic using the transaction metadata 226 to select an edge to return from the available edges of the identifier sequencing datastore 46 (block 236). Thus, the media device 12 may query the identifier sequencing datastore 46 using the node, the transaction metadata 226 associated with the node, and the business logic to return a desired edge. In certain embodiments, the business logic parameters (block 234) may include the transaction metadata 226. By way of example, business logic may be applied using transaction metadata, such as a customer number and/or an account ID, to select an edge associated with a content segment of higher quality (e.g., higher resolution), an edge associated with a content segment with shortened or no advertisements, an edge associated with a content segment of a particular rating (e.g., G, PG, R, etc.), and so forth. In some embodiments, the media device 12 may be configured to consider specifications of the media device 12 and/or environmental factors of the viewing area around the media device 12 in the determination of which edge to retrieve. For example, the media device may be configured to receive information from one or more sensors, such as light sensors, motion sensors, and/or microphones, to determine the environmental factors (e.g., noisy, light, dark, etc.), and the media device 12 may be configured to select an edge based on the environmental factors. The one or more sensors may be integrated with or operatively coupled to the media device 12. In one embodiment, the media device 12 may determine that the viewing area is noisy based on a signal received from a microphone and may select an edge associated with an audio sequence that may optimize the noisy environment. Additionally, in other embodiments, the media device 12 may determine that the media device 12 has a limited color depth and may select an edge associated with a content segment having a lower color depth (e.g., 16 bits per pixel instead of 32 bits per pixel). Further, the media device 12 may be configured to select certain edges based upon a determination that the media device 12 is a theater (e.g., cinema) playback devices versus a home playback device. Accordingly, the media device 12 may then return the selected edge for the node from the identifier sequencing datastore (block 230) and may assign the edge value as the next node value (block 232).

Figure 9:
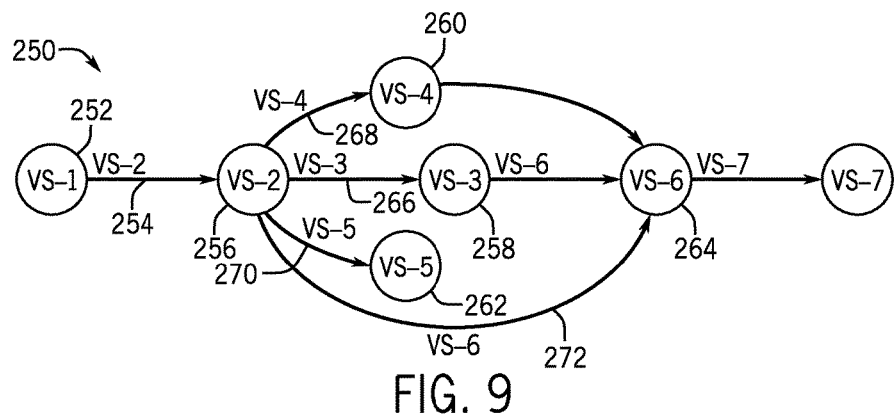
FIG. 9 is a diagrammatical representation of a content render graph for carrying out the present techniques.

Accordingly, a plurality of content segment sequencing representations may be dynamically constructed using the process 220. FIG. 9 illustrates an example of a content render graph 250 that forms multiple ordered paths that each expresses a possible playback order of the content to be played back content segment by content segment. While the illustrated example of the content render graph 250 includes multiple ordered paths of playback, it should be borne in mind that in other embodiments, multiple content render graphs may be constructed to express only one possible playback order. In embodiments in which the content render graph includes multiple ordered paths of playback, the processing circuitry 36 may be configured to select an ordered path from the multiple ordered paths of playback using the process 220.

As illustrated in FIG. 9, the content render graph 250 includes a plurality of the nodes 102 and the edges 104. As noted above, each node represents an identifier that uniquely identifies a content segment to be played back by the playback circuitry 42 in the order directed by the content render graph, while each edge represents an identifier that uniquely identifies the next content segment of the content render graph to be played back. Additionally, each node 102 include a reference to one or more subsequent nodes 102 and/or may be associated with one or more subsequent nodes 102 based at least in part upon sequencing relationships provided by the identifier sequencing datastore 46. These references and/or sequencing relationships may be used to define the edges 104 pointing to the subsequent nodes 102. For example, the illustrated embodiment of the content render graph 250 includes a first identifier 252, which represents a first identifier that uniquely identifies a first content segment. The content render graph 250 also includes a first edge 254 that connects the first node 252 to a second node 256, which uniquely identifies the next content segment for playback. As illustrated, the second node 256 is associated with multiple subsequent nodes (i.e., a third node 258, a fourth node 260, a fifth node 262, and a sixth node 264) by multiple edges (i.e., a second edge 266, a third edge 268, a fourth edge 270, and a fifth edge 272), and the processing circuitry 36 may be configured to determine the appropriate subsequent or next node for playback using the business logic and the transaction metadata 226 as described above with respect to FIG. 8.

Dynamically composing content by creating a plurality of content segment sequencing representations and/or content sequencing representations with multiple ordered playback paths (e.g., the content render graph 250) may be desirable to create a plurality of content versions using a set of content segments, which may allow for more customized versions of the content. By way of example, the transaction metadata 226 (e.g., customer number, account ID, etc.) associated with the second node 256 may indicate that the customer meets certain criteria that entitles the customer to receive premium and/or upgraded content. In one embodiment, the transaction metadata 226 associated with the second node 256 may indicate that the customer meets certain criteria to enable the customer to receive content with advertisements removed. For example, the third content segment 258 may include an advertisement. The processing circuitry 36 may use the transaction metadata 226 and the second node 256 to select the fifth edge 272 that points to the sixth content segment 264, thus skipping the advertisement of the third content segment 258. In other embodiments, the third content segment 258 may include a standard version of content (e.g., a standard resolution version) and the fourth content segment 260 may include an upgraded and/or premium version of content (e.g., a high resolution version, an extended and/or upgraded scene, etc.). In such embodiments, the processing circuitry 36 may use the transaction metadata 226 and the second node 256 to select the third edge 268 that points to the fourth content segment 260 rather than the second edge 266 that points to the third content segment 258.

In some embodiments, the transaction metadata 226 associated with the second node 256 may indicate that the customer meets certain criteria that entitles the customer to receive a custom version of the content. For example, a media device manufacturer may offer customers custom versions of content that are not available to other devices. Thus, the media device ID, model, and/or type may indicate that the customer may receive a custom version of content. For example, the third content segment 258 may include a standard content segment of the content and the fourth content segment 260 may include a custom content segment (e.g., customized based upon the transaction metadata 226) of the content. In such embodiments, the processing circuitry 36 may use the transaction metadata 226 and the second node 256 to select the third edge 268 that points to the fourth content segment 260 rather than the second edge 266 that points to the third content segment 258.

In certain embodiments, the content may be customized for the customer based upon customer preferences (e.g., inputted preferences and/or learned preferences), customer location, and/or customer ID. For example, multiple video segments may be generated that each include a scene with a football game, and each version of the video segment may include a different football team. Thus, the content may be customized to select a video segment including a particular football team based upon the customer preferences for the particular football team and/or the geographic location of the customer (e.g., the location of the football team). For example, the third content segment 258 may include a content segment of a football game of the Greenbay Packers versus the Dallas Cowboys and the fourth content segment 260 may include a football game of the Houston Texans versus the New York Giants. The transaction metadata 226 may indicate that the customer likes the Houston Texans and/or lives in Houston, Tex. Thus, the processing circuitry 36 may use the transaction metadata 226 and the second node 256 to select the third edge 268 that points to the fourth content segment 260 rather than the second edge 266 that points to the third content segment 258. Similarly, content segments including advertisements may be customized for the customer based upon transaction metadata 226 relating to customer preferences (e.g., inputted preferences and/or learned preferences), customer location, and/or customer ID.

Furthermore, content segments including advertisements may be customized for the customer based upon transaction metadata 226 relating to previously played backed content segments of the content segment sequencing representation. As noted above, the media device 12 may be configured to store information relating to which nodes and/or content segments have been retrieved and/or played back. The media device 12 may use the information as transaction metadata 226 to determine which content segment to retrieve for playback. For example, if the media device 12 determines that three advertisements relating to football have been recently played back, the media device 12 may select a content segment including an advertisement that is not about football. Additionally, in certain embodiments, the media device 12 may be configured to measure an affinity between nodes to select a content segment for playback. For example, a content segment sequencing representation may include a node associated with an advertisement for a Honda Odyssey, but the media device 12 may determine that the particular advertisement for the Honda Odyssey is undesirable (e.g., due to high cost or poor network performance). The media device 12 may then search the content segment datastore 48 for one or more nodes with an affinity to the Honda Odyssey node, and may be configured to select the content segment with the highest affinity to the Honda Odyssey node, given that the content segment is compatible with the media device 12. For example, the media device 12 may be configured to select a node associated with a different Honda advertisement to replace the Honda Odyssey advertisement.

Figure 10:
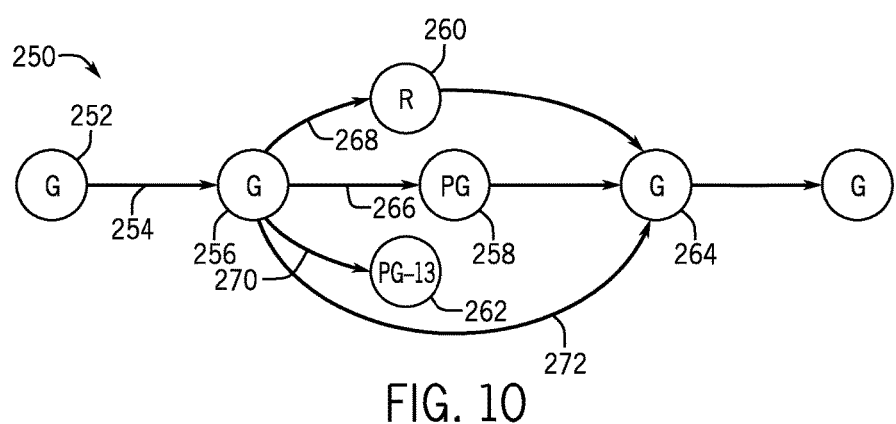
FIG. 10 is a diagrammatical representation of a content render graph for carrying out the present techniques.

As noted above, the transaction metadata 226 may also include ratings for each content segment. For example, the each content segment may be associated with transaction metadata 226 identifying the respective content segment as G, PG, PG-E, PG-13, R, X, or any other suitable rating. This may be desirable to create multiple versions of the content having different ratings, which may enable the customer to select a version of the content with a desired rating. For example, the transaction metadata 226 associated with the customer ID and/or customer preferences may indicate that the customer is interested in and/or is specifically requesting only G-rated content. As illustrated in FIG. 10, the first content segment 252, the second content segment 256, and the sixth content segment 264 may each be associated with transaction metadata 226 identifying the respective content contents as G-rated content segments. Accordingly, to dynamically compose G-rated content, the processing circuitry 36 may be configured to use the transaction metadata 226 to select the fifth edge 272 that points to the sixth content segment 264, thereby skipping the third content segment 258 that is associated with transaction metadata 226 identifying the third content segment 258 as a PG-rated content segment. As will be appreciated, in other embodiments the transaction metadata 226 may indicate that the customer is interested in a different rating. As such, the processing circuitry 36 may be configured to select the second edge that points to the third content segment 258 that is associated with a PG rating, the third edge 268 that points to the fourth content segment 260 that is associated with an R rating, or the fourth edge 270 that points to the fifth content segment that is associated with a PG-13 rating based at least in part upon the transaction metadata 226.

Figure 11:
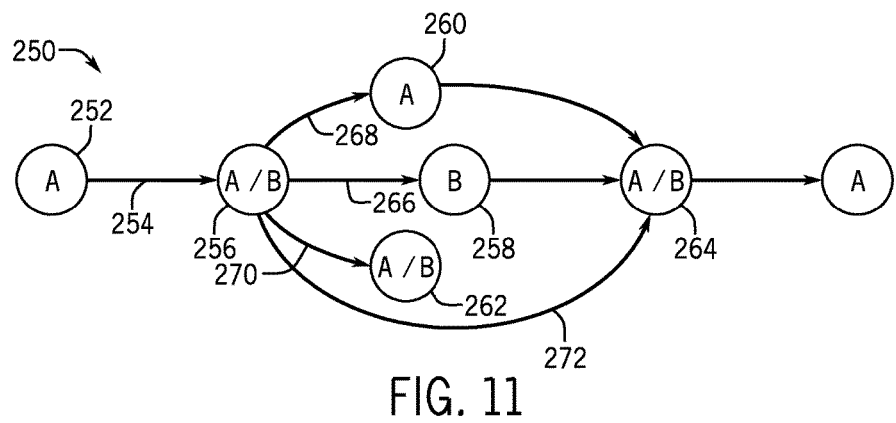
FIG. 11 is a diagrammatical representation of a content render graph for carrying out the present techniques.

Additionally, the content may be customized to omit portions of content using the transaction metadata 226. For example, portions of the content may be omitted due to time constraints for viewing the content and/or space constraints of the media device 12. Thus, the system 10 may be configured to dynamically reduce a video by omitting one or more content segments to fit the viewer's playback window and/or to produce a smaller version of the video to fit a media device with limited storage. For example, a 90 minute movie may be reduced to 60 minutes. Additionally portions of the content may be omitted, because they are not of interest to the customer. For example, a video may include two storylines (e.g., storyline A and storyline B). As illustrated in FIG. 11, the first node 252 and the fourth node 260 of the content render graph 250 may each be associated with transaction metadata 226 identifying the content segments as relating to storyline A. Additionally, the second node 256 and the sixth node 264 may be associated with transaction metadata 226 identifying the content segments as relating to both storyline A and B. Further, the third node 258 may be associated with transaction metadata 226 identifying the content segment as relating to storyline B. In embodiments in which the customer is only interested in storyline A, the processing circuitry 36 may be configured to use the transaction metadata 226 to return the third edge 268 that points to the fourth content segment 260 that relates to only storyline A. Thus, any content segments that only include storyline B are omitted, and content segments that only include storyline A are given priority over content segments relating to both storyline A and B.

Figure 12:
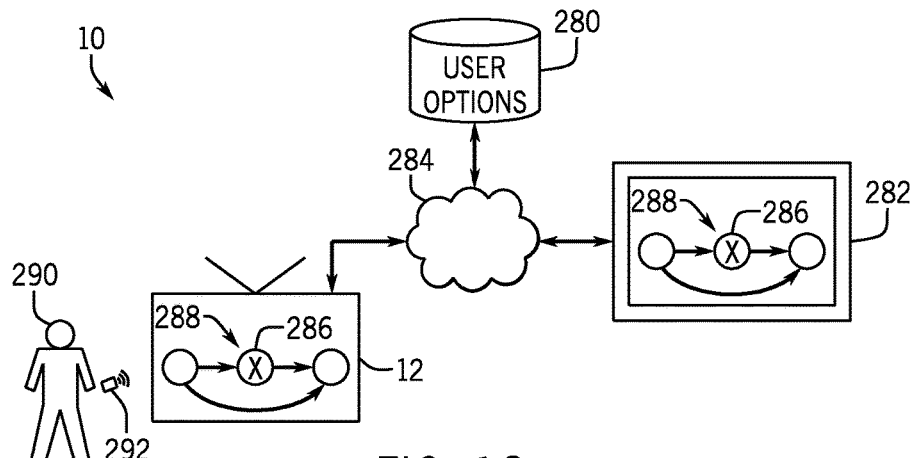
FIG. 12 is a diagrammatical representation of a content delivery system for carrying out the present techniques.

As noted above, the transaction metadata 226 may include customer preferences, which may be inputted preferences or learned preferences. FIG. 12 illustrates an example of the system 10 that may be configured to use the inputted and/or learned preferences to dynamically compose content on the media device 12, as well as on other media devices that are associated with the customer (e.g., via a customer ID or account number). For example, the customer may be configured to input preferences relating to types of content to skip, such as content segments including violence, language, sexual content, scary situations, etc. In certain embodiments, the customer preferences may be stored in a user preferences datastore 280. The user preferences datastore 280 may be communicatively coupled to the media device 12 and/or any additional devices 282 (e.g., a smartphone, a tablet, an iPad, a computer, and/or a playback device of a car) via the internet 284. Thus, any additional devices 282 that are associated with the customer ID and/or account number of the customer may use the customer ID and/or account number to access the customer preferences stored in the user preferences datastore 280. As such, content segments (e.g., a second content segment 286 of a content render graph 288) that include content identified by the customer as undesired (e.g., skip points) may be omitted on all media devices associated with the customer using the transaction metadata 226.

Additionally or alternatively, the processing circuitry 36 may be configured to store information relating to content that is skipped by the customer during playback to generate learned customer preferences. The learned customer preferences may be associated with the customer ID and/or account number and stored in the user preferences datastore 280 to enable the learned customer preferences to be accessed by the media device 12 and the additional devices 282. In certain embodiments, the processing circuitry 36 may store the video segments of a video that are skipped, and the additional devices 282 may omit the stored video segments during playback of the same video using the transaction metadata 226. For example, a customer 290 may skip a scene of a video (e.g., the second content segment 286 of the content render graph 288) using a remote 292. The processing circuitry 36 may be configured to store the skipped second content segment in the user preferences datastore 280 with the customer ID. Thus, the additional device 282 may access the user preferences datastore 280 using the customer ID and may apply the transaction metadata 226 (e.g., the learned customer preferences for the skipped content segment) to omit the second content segment 286 of the content render graph 288.

Figure 13:
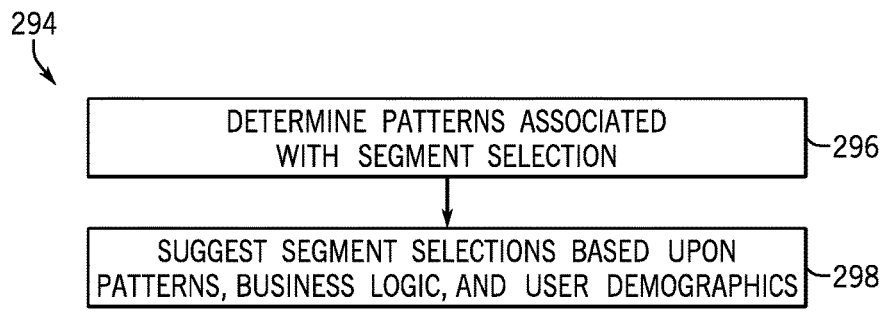
FIG. 13 is a diagrammatical representation of a process for recommending content playback based on user preferences.

The processing circuitry 36 may also automatically learn customer preferences. In particular, the processing circuitry 36 may automatically learn which content segments the customer may likely want to skip, rather than only skipping content segments which have been skipped by the customer. This may be desirable to recommend skip points and/or versions of content with scenes omitted to the customer that may be of interest to the customer. For example, the customer may select a movie to watch on the media device 12, such as an On Demand movie, a pay-per-view movie, or a recorded movie, and the media device 12 may recommend omitting one or more content segments of the movie prior to playback and/or may automatically omit one or more content segments of the movie during playback based upon the learned customer preferences. Additionally, in certain embodiments, the inputted and/or learned customer preferences may be stored in the user preference datastore 280, which may be accessed by media devices of other customers to recommend skip points and/or versions of content with scenes omitted to the other customers. For example, FIG. 13 illustrates a flow chart of a process 294 for using learned customer preferences to suggest content sequencing representations for playback. The process 294 may include determining patterns associated with content segment selection (block 296). In certain embodiments, determining patterns associated with content segment selection may include determining patterns relating to skipped or omitted content segments. For example, the processing circuitry 36 may be configured to categorize the content that is skipped by the user into one or more types of content, such as violence, language, sexual content, scary situations, etc., to determine patterns associated with the skipped content.

The process 290 may also include suggesting content segment selections (e.g., skip points) based upon the determined patterns, business logic, and/or user demographics (block 298). For example, the system 10 (e.g., the media device, the user preferences datastore 280, and/or the additional devices 282) may be configured to collect demographics data for one or more customers, such as age, gender, geographic location, number and/or ages of possible children, and so forth. A media device associated with a customer ID may determine demographic information for the customer associated with the customer ID, and may search the user preferences datastore 280 for content segment patterns of customers having similar demographic information. The media device may then retrieve the content segment patterns of one or more customers having similar demographic information to the customer of interest or may retrieve the content segment patterns of the customer having the closest demographic information to the customer of interest, and the media device may suggest the returned content segments patterns of the customer. By way of example, the user preferences datastore 280 may store a content segment pattern of skipping content segments that are identified as R-rated content and may associate the content segment pattern with demographics data identifying the customer as a parent of a 12 year old child. The stored content segment pattern may be suggested to other parents of similarly aged children (e.g., 10-15 years old).

Accordingly, a plurality of content versions may be created and may be customized for the customer based on transaction metadata 226 and business logic parameters. In some embodiments, the media device 12 may be configured to provide an indication to the customer that the customer watched a unique or customized version of content. For example, the media device 12 may provide an indication (e.g., a textual message) at the end of the playback of the content. Additionally or alternatively, the media device 12 may be configured to store information relating to customized versions of content watched by the customer. For example, the media device 12 may be configured to create and store a log of all customized versions of content watched by the user. In some embodiments, the log may be stored on the memory of the media device. In other embodiments, the log may be associated with a customer account number, so the customer may view the log from a different device, such as viewing the log on a computer using the internet. Further, in some embodiments, the media device 12 may be configured to receive information relating to customized versions of content watched by other users (e.g., friends or family of the customer) and may provide the information to the customer. For example, if the customer watched a custom version of a movie, the media device 12 may provide a comparison of custom versions of the movie watched by other customers to the custom version of the movie watched by the customer. By way of example, the comparison may include a list of scenes skipped or substituted (e.g., for a custom content segment).

Figure 14:
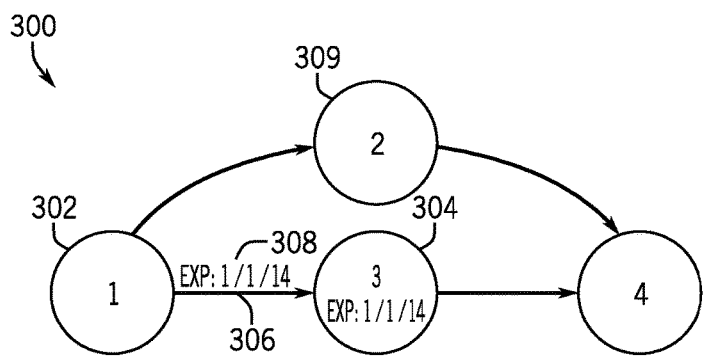
FIG. 14 is a diagrammatical representation of a content render graph for carrying out the present techniques.

As noted above, the content segments sequencing representations may also be used to increase access control over the content. For example, the edges 104 and/or the transaction metadata 226 associated with the nodes 102 may include time and/or business rules, which may be used to limit access to the content segments to prohibit the playback of such content segments. In certain embodiments, the transaction metadata 226 may include time and/or business rules created by one or more entities involved during the production and/or editing of the content segments, such as a producer or a director. In one example, the time and/or business rules may prohibit the edge 104 from being available for playback after the number of times that the content segment 74 identified by the edge 104 has been played back exceeds a predetermined maximum number of playbacks for the content segment 74. Additionally, the time and/or business rules may include rules that prohibit the edge 104 from being available for playback before a certain date and/or time or after a certain date and/or time. In one use case, this threshold count functionality may be beneficial in ad-scheduling based upon promised impressions. For example, a first advertisement may be offered until a particular number of impressions is reached. After the count threshold is reached, the advertisement may be switched. As illustrated in FIG. 14, a content render graph 300 may include a first node 302 connected to a second node 304 by a first edge 306. The first edge 306 includes a time rule 308 that prohibits playback of the second node 304 after a predetermined date (e.g., Jan. 1, 2014). However, it should be noted that in other embodiments, the second node 304 and/or the transaction metadata 226 may include the time rule. Accordingly, after the predetermined date, the content render graph 300 may prohibit playback of the second node 304 and, in some embodiments, may select an alternate node 309 for playback.

Figure 15:
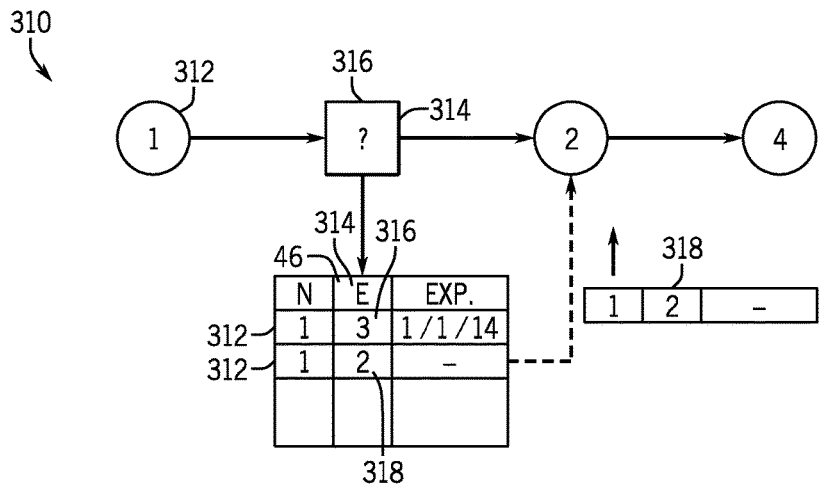
FIG. 15 is a diagrammatical representation of a content render graph for carrying out the present techniques.

In other embodiments, the time and business rules may prohibit retrieval of the nodes 102 and/or edges 104 from the one or more identifier sequencing datastores 46. For example, as illustrated in FIG. 15, a content render graph 310 may include a first node 312 connected to a variable edge 314, as indicated by query block 316. In particular, the first node 312 (e.g., the identifier associated with the node 312) and the transaction metadata 226 (e.g., time and date) may be used to search the identifier sequencing datastores 46 for the appropriate edge 314. As illustrated in the identifier sequencing datastore 46, the first node 312 is associated with two possible edges 314, which are each associated with a different next node, and thus a different next content segment. The first possible edge 316 is also associated with and/or includes a rule that indicates that the edge 316 is not available after a predetermined date. Thus, if the identifier sequencing datastore 46 determines that the current date is after the predetermined date, the identifier sequencing datastore 46 may prohibit the retrieval of the first possible edge 316 by the media device 12. As illustrated, the second possible edge 318 does not include a business rule. Thus, the second edge 318 may be retrieved by the media device 12 for the content render graph 310. Additionally, in certain embodiments, the media device 12 may be configured to inform the user if the edge returned from the identifier sequencing datastore 46 is not the edge requested. For example, the media device 12 may be configured to provide a indication (e.g., a first indicator light on the media device 12, a textual message, etc.) to inform the user that a different edge has been returned due to time and/or business rules or for the user's benefit (e.g., upgraded content and/or content retrieved from an optimal source). Additionally, in some embodiments, the media device 12 may also provide an indication (e.g., a second indicator light on the media device 12, a textual message, etc.) to inform the user that the edge returned is not the edge requested due to tampering with the system 10.

As described in detail above, the present techniques utilize fingerprint-defined segment-based content and identifiers associated with the fingerprints of the content segments for dynamic composition of the content. For example, rather than playing back linear, contiguous content (e.g., a contiguous video file), the system 10 may dynamically compose content using content segment sequencing representations that define a desired playback order of content segments. The present techniques may increase storage efficiency. In particular, because content may be dynamically composed by constructing different content segment sequencing representations, a plurality of content versions may be created using a set of content segments. Thus, the different content versions may not need to be stored, but may be composed prior to or during playback. Furthermore, the content segments may be stored in a plurality of content segment datastores, which may be accessed by the media device (e.g., via the internet), which may further reduce the storage required by the media device.

Moreover, the present techniques may increase the degree of customization associated with the content. That is, transaction metadata relating to the content segment associated with the node, the user (e.g., a customer ID/account number, customer preferences, customer location, and so forth), the media device (e.g., type, model, ID, manufacturer, and so forth), the network provider, the retrieval transaction, and/or any special offer identifiers may be applied to business logic to dynamically select a content segment for playback. For example, the content may be customized to include content of interest to the user, to omit content that is not of interest to the user, to shorten the playback time to fit a user's playback window, and so forth. This customization may be completed using any of the functionality described herein, either alone or in combination with other functionality described herein. For example, in an effort to reduce storage size and/or play time of content, the dynamic plot selection of FIG. 11 may be implemented alone or in combination with the scene skipping functionalities discussed in FIGS. 12 and 13.

As noted above, the system 10 may be configured to playback content 20 and coordinated content 50. As will be described in more detail below, the system 10 may synchronize the playback of the content 20 and the coordinated content 50 using one or more content segment sequencing representations including nodes 102 and edges 104 for both the content 20 and the coordinated content 50. By rendering content at the content segment level of granularity (e.g., at the frame/frameset resolution), the coordinated content may be more tightly and dynamically synchronized to the content. Additionally, the system 10 may be configured to synchronize playback of the content 20 and the coordinated content 50 on the media device 12 and/or may synchronize playback of the content 20 on the media device 12 with the playback of the coordinated content 50 on one or more coordinated devices 54.

Figure 16:
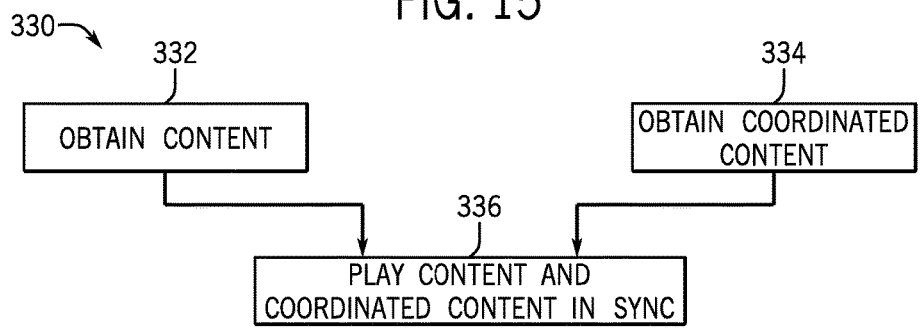
FIG. 16 is a diagrammatical representation of a process for synchronizing content and coordinated content.

FIG. 16 illustrates an example process 330 for playing back content and coordinated content. The process 330 includes obtaining content 20 (block 332). As described in detail above, the content 20 may be obtained from one or more content providers 22. Additionally, the content 20 may include the content segments 74, one or more identifiers 24 that each uniquely identifies a respective content segment 74, transaction metadata 226, and/or a content segments sequencing representation that defines the playback order of the content 20 content segment by content segment. The process 330 also includes obtaining coordinated content 50 (block 334). In some embodiments, the coordinated content 50 may be supplemental (e.g., secondary) content. As noted above, the content 50 may be obtained from one or more content providers 52. It should be noted that the content 20 and the coordinated content 50 may be obtained from the same type or different types of content providers. For example, in some embodiments, the content 20 may be obtained from a cable provider and the coordinated content 50 may be obtained from an Internet-based provider. Additionally, the coordinated content 50 may include content segments 74, one or more identifiers 24 that each uniquely identifies a respective content segment 74, transaction metadata 226, and/or a content segments sequencing representation that defines the playback order of the content 20 content segment by content segment. As noted above, the coordinated content 50 may be intended to directly compliment the content 20, such as in the case of music, foreign language audio, or other content which is intended directly to be played simultaneously with the content 20. In other cases the coordinated content 50 may be somewhat loosely linked to the content 20, such as to provide details regarding the content 20, additional information regarding plots, characters, actors, and the like, offers for additional information that may be of interest, sports scores and statistics, stock prices, and/or product and service offerings. Further, in some embodiments, the supplemental content 50 may include advertisements and/or announcements, which may relate to the content 20 or may relate to other content that may be of interest to the customer. In other contexts, the coordinated content 50 may simply be directed to the target audience based upon selection of the content type, as indicated by a geographic location of playback, a demographic drivable from the primary content or other information stored on the media device 12 or known about the audience, and so forth.

The process 330 also includes playing back the content and the coordinated content in sync (block 336). Playing back the content and the coordinated content in sync may include dynamically constructing a content segment sequencing representation including nodes 102 and edges 104 for both the content 20 and coordinated content 50. In particular, the edges 104 of the content segment sequencing representation may enable playback of the content and coordinated content with contextual information (e.g., defining the playback order of the content and coordinated content in relation to each other).

Figure 17:
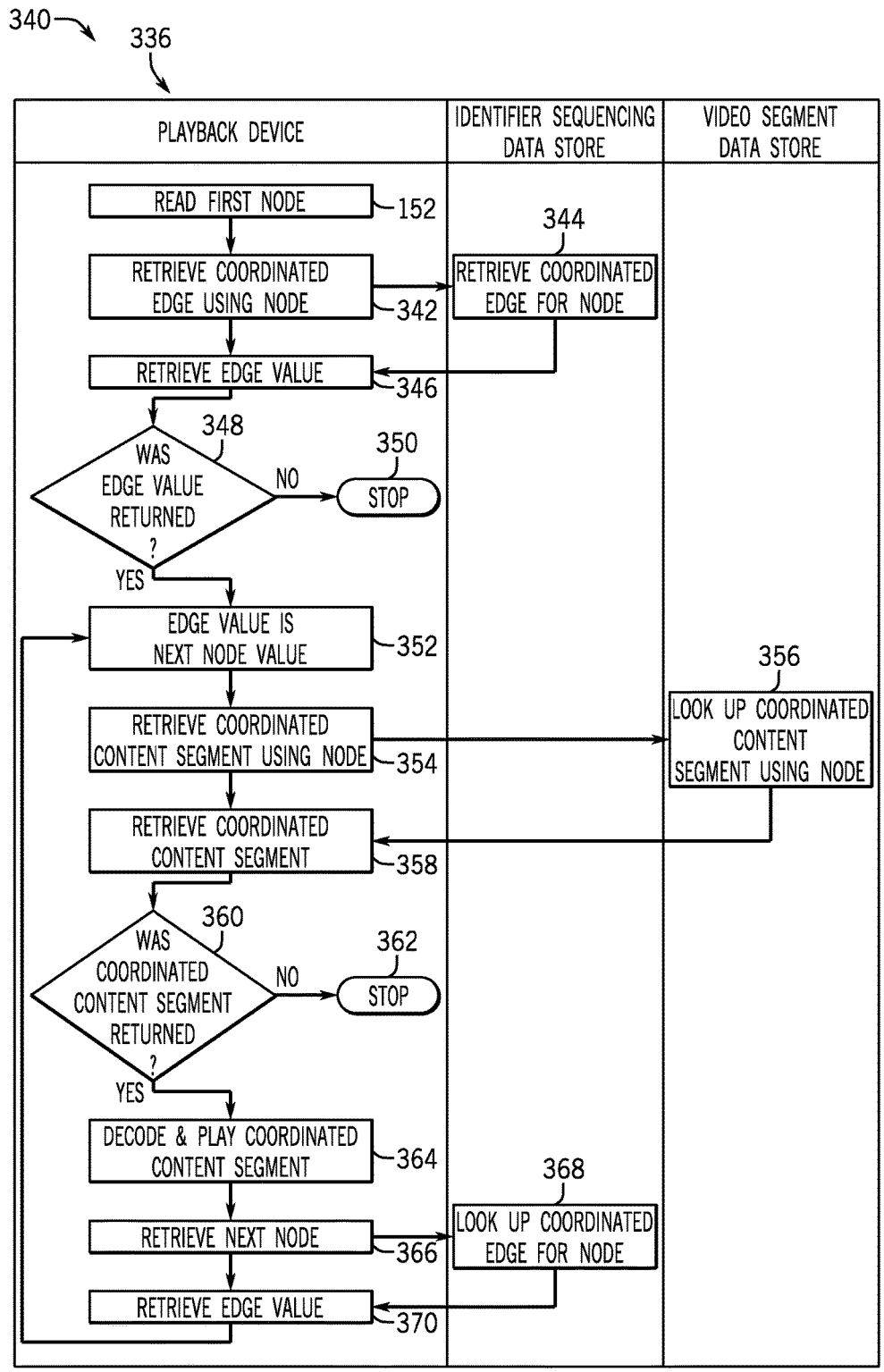
FIG. 17 is a diagrammatical representation of a process for synchronizing content and coordinated content.

FIG. 17 illustrates a more detailed process 340 for playing back the content and the coordinated content in sync (block 336). The process 340 may include obtaining content (block 332) and obtaining coordinated content (block 334), as described above with respect to FIG. 16. The process 340 also includes reading a first node (block 152), as described above with respect to FIG. 5. Moreover, it should be noted that the steps for playing back content 20 may include one or more additional steps of the process 150 of FIG. 5. Further, it should be noted that the steps relating to the playback of the coordinated content 50 may be performed by the media device 12, the coordinated device 54, or any other suitable device.

In addition to providing information relating to the playback of the content, the first node may also provide information relating to the playback of coordinated content. Accordingly, the first node (e.g., the identifier associated with the first node) may be used to retrieve a coordinated edge for the node (block 342). In certain embodiments, the media device 12 and/or the coordinated device 54 may be configured to retrieve a coordinated edge associated with the first node in a content render graph or in a table, which may be broadcasted to the media device 12 and/or the coordinated device 54. In other embodiments, the process 340 may include looking up the coordinated edge using the node from a sequencing service (e.g., the identifier sequencing datastore 46) (block 344). It should be noted that transaction metadata 226 for the content 20 and/or the coordinated content 50 may be used in combination with business logic parameters, as described above with respect to FIG. 8, to select an appropriate coordinated edge from a plurality of available coordinated edges associated with the node. The media device 12 and/or the coordinated device 54 may then retrieve the coordinated edge value (block 346) and determine whether the coordinated edge value was returned (block 348). If the coordinated edge value was not returned, the process 340 may stop (block 350).

If the media device 12 and/or the coordinated device 54 determines that the coordinated edge was returned, then the coordinated edge value may be used as the coordinated node for the content segment sequencing representation (block 352). The process 340 may then include retrieving the coordinated content segment using the coordinated node as the identifier that uniquely identifies the coordinated content segment (block 354). For example, the media device 12 and/or the coordinated device 54 may search a content segment datastore (e.g., a coordinated content segment datastore or the video segment datastore 48) using the node (e.g., identifier) as a key (block 356). The media device 12 and/or the coordinated device 54 may then retrieve the coordinated content segment from the content segment datastore (block 358) and may determine whether the coordinated content segment was returned to the media device 12 and/or the coordinated device 54 (block 360). If the coordinated content segment was not returned, the process 340 may stop (block 362). If the media device 12 and/or the coordinated device 54 determines that the coordinated content segment was returned, then the media device 12 and/or the coordinated device 54 may decode and play the coordinated content segment (block 364).

The media device 12 and/or the coordinated device 54 may then retrieve the next node (e.g., identifier) associated with the next coordinated content segment for playback (block 366). For example, the media device 12 and/or the coordinated device 54 may look up the coordinated edge for the node from the identifier sequencing datastore (block 368) or may retrieve the coordinated edge from a constructed content segment sequencing representation. The media device 12 and/or the coordinated device 54 may retrieve the edge value (block 370) and may use the edge value as the next node value (block 352).

Figure 18:
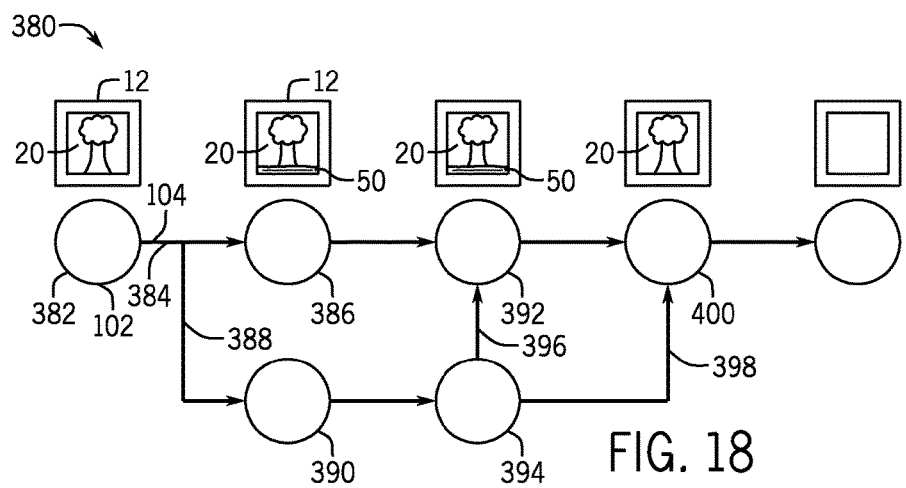
FIG. 18 is a diagrammatical representation of a content render graph for synchronizing content and coordinated content.

Accordingly, a plurality of content segment sequencing representations may be dynamically constructed using the process 340, which may be combined with the process 150 of FIG. 5 and the process 220 of FIG. 8. For example, FIG. 18 illustrates an example of a content render graph 380 that forms an ordered path expressing the playback of content 20 and coordinated content 50. Additionally, FIG. 18 illustrates an example of the content 20 and coordinated content 50 as they are played back at each node 102 of the content render graph 380. As illustrated, the primary content 20 and the coordinated content 50 are both played back on the same device (e.g., the media device 12). To direct the media device 12 that both the content 20 and the coordinated content 50 should be played back on the media device 12, the transaction metadata 226 for the content 20 and/or the coordinated content 50 may include information relating to the desired playback device for the coordinated content 50.

As illustrated, the content render graph 380 begins with a first node 382 that uniquely identifies a content segment for playback. The first node 382 may be associated with a first content edge 384 that identifies the next node 386. Additionally, the first node 382 may be associated with a first coordinated edge 388 that identifies a first coordinated node 390, which may uniquely identify a coordinated content segment for playback. Playback of the content segment associated with the node 386 and playback of the coordinated content segment associated with the coordinated node 390 may be synchronized, because the first node 382 is connected to the two edges 384 and 388, and thus, directs the synchronized playback of the content segments associated with the node 386 and the coordinated node 390.

The content render graph 380 may also include a third node 392 and a second coordinated node 394. Playback of the nodes may be directed by the edges preceding the respective nodes, as described above with respect to FIG. 9. Additionally, the content render graph 380 may include a first synchronizing edge 396 connecting the third node 392 and the second coordinated node 394. The first synchronizing edge 396 may direct the media device 12 to synchronize the playback of the content segments associated with the third node 392 and the second coordinated node 394. Additionally, the content render graph 380 may include a second synchronizing edge 398 connecting the second coordinated node 394 to a fourth node 400. The second synchronizing edge 398 may include a rule and/or transaction metadata 226 that may direct the media device 12 to synchronize the playback of the content segment associated with the second coordinated node 394 with the content segment associated with the fourth node 400 or may direct the media device 12 to terminate the playback of the content segment associated with the second coordinated node 394 prior to playback of the content segment associated with the fourth node 400.

Figure 19:
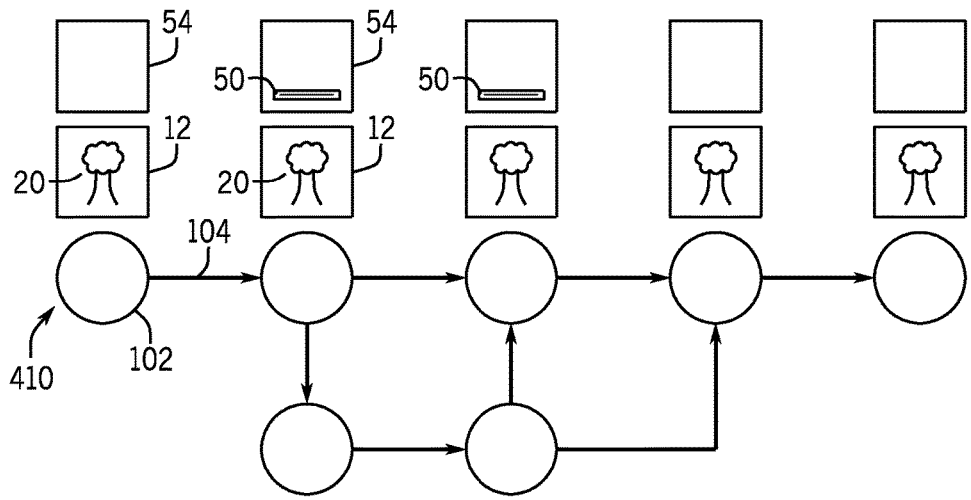
FIG. 19 is a diagrammatical representation of a content render graph for synchronizing content and coordinated content.

As noted above, playback of the content 20 and coordinated content 50 may also be synchronized on separate devices. For example, FIG. 19 illustrates an example of a content render graph 410 that forms an ordered path expressing the playback of content 20 and coordinated content 50 on separate devices. As noted above, rules and/or transaction metadata 226 associated with the nodes 102 and/or the edges 104 may indicate that the content 20 and the coordinated content 50 should be played back and synchronized on separate devices. As illustrated, the content 20 may be played back on one device (e.g., the media device) and the coordinated content 50 may be played back on a different device (e.g., the coordinated device 54). The nodes 102 and the edges 104 of the content render graph 410 may function similar to that of the content render graph 380, as described above with respect to FIG. 18.

In some embodiments in which the playback of the content 20 and the coordinated content 50 are synchronized on separate devices (e.g., the media device 12 and the coordinated device 54), the content render graph 410 may be transmitted to the coordinated device 54 to direct the playback of the coordinated content 50 by the coordinated device 54. The content render graph 410 may be dynamically constructed by the media device 12 or may be transmitted to the media device by one of the content providers 22. In certain embodiments, the media device 12 may receive a content render graph, or other type of content segment sequencing representation, from the content providers 22, and may determine which nodes of the content render graph to playback on the media device and which nodes to transmit to the coordinated device 54 for playback. That is, the media device 12 may be configured to analyze the content render graph (e.g., using transaction metadata 226 and/or business logic) to select a suitable playback device for each node of the content render graph.

As noted above, the present techniques utilize fingerprint-defined segment-based content and identifiers associated with the fingerprints of the content segments for dynamic composition and synchronization of content and coordinated content. Additionally, segmenting the content may provide increased access control over the content. For example, selected content segments may be transmitted to an editing/post-production company for editing, rather than a complete, contiguous content file. In other embodiments, an encrypted version of the complete, contiguous content file may be transmitted to an editing/post-production company along with a key management scheme, which may enable the editing/post-production company to only access the content segments to be edited.

Figure 20:
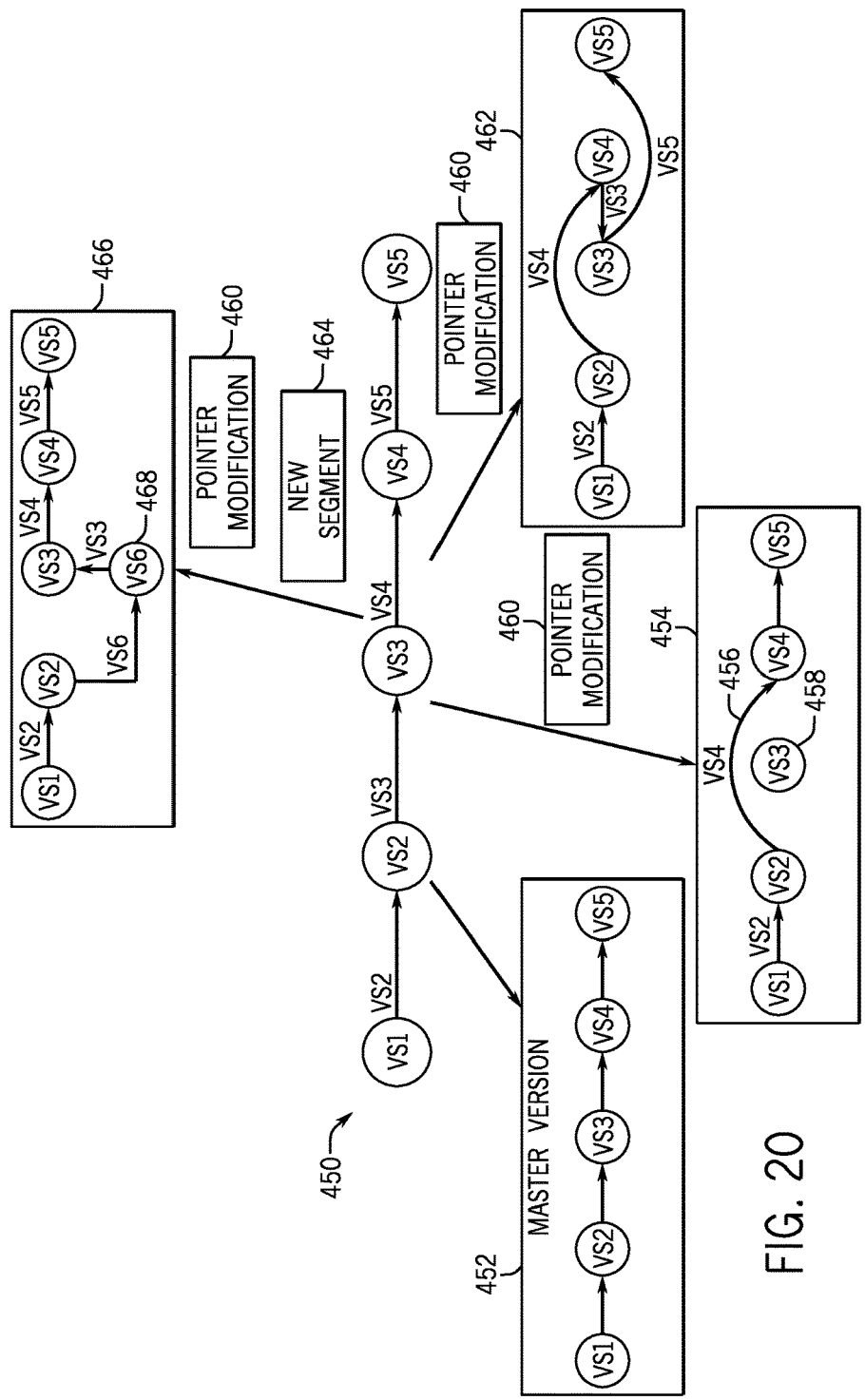
FIG. 20 is a diagrammatical representation of a content render graph for editing content.

Furthermore, segmenting the content may be desirable during the editing process as a master content version may remain unedited, while multiple versions of the content may be created by constructing different content segment sequencing representations. For example, FIG. 20 illustrates an example of a content render graph 450 for editing content. The content render graph 450 may be based upon and altered from a master content version 452 to create edited content render graphs and thus, edited content. For example, the content render graph 450 may be edited from the master content version 452 to delete one or more content segments. In particular, as illustrated by a content render graph version 454, a new edge 456 may be added in order to skip (e.g., omit) a node 458. In some embodiments, a pointer modification component 460 may be used to alter edit the content render graph 450. For example, a user may input desired edits to the pointer modification component 460, which may implement software to create a new version of the content render graph based on the inputted edits by adding and deleting edges. In other embodiments, the content render graph 450 may be edited to rearrange nodes, as illustrated in a content render graph version 462. Additionally, in some embodiments new nodes 464 associated with new content segments may be added to create a content render graph version 466 with an additional node 468. Accordingly, the pointer modification component 460 may direct the insertion of the node 468 into the content render graph 466 by addition and deleting edges. In some embodiments, the new nodes 464 may be associated with different versions Additionally, the pointer modification component 460 may include an undo function to revert the content render graph to a previous content render graph version, which may be the most recent content render graph version, the original content render graph version, or an intermediate content render graph version. Furthermore, the pointer modification component 460 may be configured to record and store all of the modifications made to the content render graph.

In some embodiments, the pointer modification component 460 may be configured to use business logic and/or rules to determine the edits for the content render graph 450. Additionally, the pointer modification component 460 may be configured to add business logic, business rules, and/or metadata to the nodes and/or edges of the content render graph 450. In one embodiment, a producer, director, or other individual or entity involved in the production and/or editing of the content may add business logic, business rules, and/or metadata to the content render graph 450 using the pointer modification component 460. For example, the pointer modification component 460 may be configured to add metadata about the content segment identified by the node, such as metadata identifying the quality of the content segment (e.g., high definition, standard definition, etc.), the color depth (e.g., bit depth) of the content segment, the audio bit depth of the content segment, a rating of the content segment (e.g., G, PG, PG-13, R, M, NC-17, etc.), one or more countries that the content segment is geographically compatible with, the duration of the content segment, information relating to the subject matter and/or storyline of the content segment, information identifying the content segment as an advertisement, information identifying the content segment as including premium content, or any other suitable information. This information may be desirable to facilitate the dynamic playback of content by the media device 12.

Figure 21:
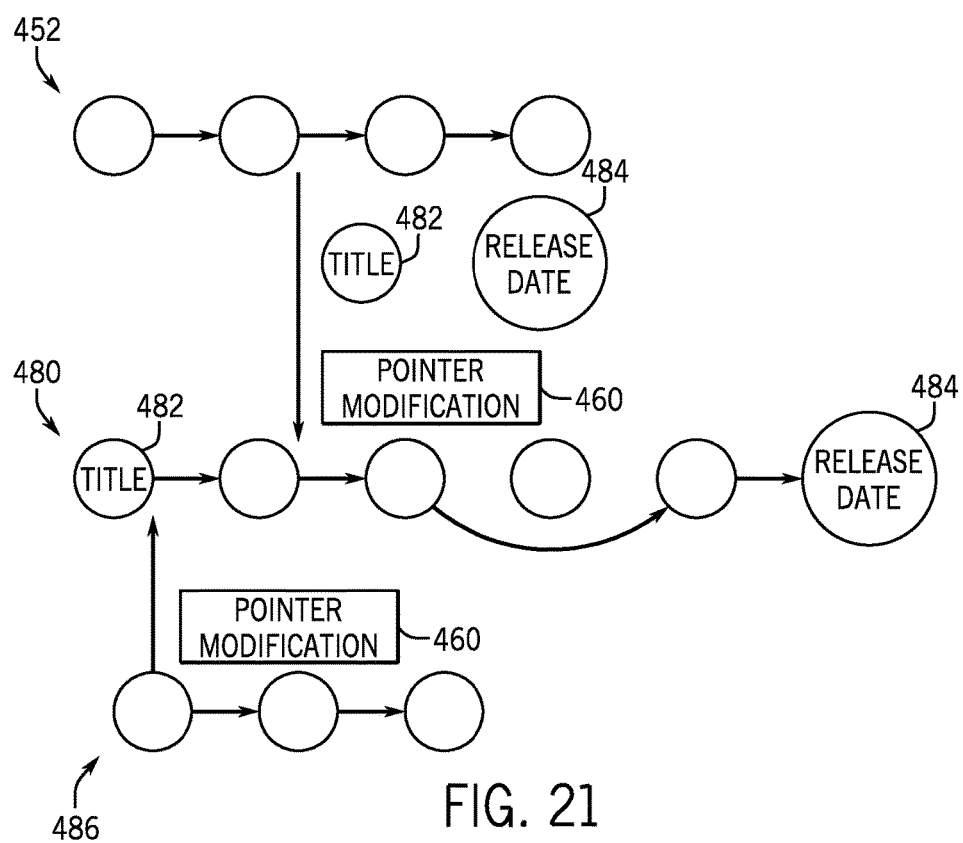
FIG. 21 is a diagrammatical representation of a content render graph for editing content.

The master content version 452 may also be edited to create additional content relating to the content, such as content summaries, highlights, trailers, videos including commentary, and so forth. This may be desirable, because the content does not need to be re-rendered in order to create new content. Rather, new content segment sequencing representations may be created to create the new content. This may decrease the storage space required and also may decrease the copying, transmission, and/or movement of the content during production, because only the changes to the content segment sequencing representation may be stored, transmitted, and/or shared. For example, FIG. 21 illustrates an example content render graph 480, which may be created using the master content version 452, which may direct the playback of the content segments to create a trailer. As illustrated, a new node 482 associated with a content segment including a title scene may be added using the pointer modification component 460. Additionally, a second new node 484 may be added that is associated with a content segment of a scene including a release date for the content (e.g., a movie release date). Further, any number of new nodes may be added to the content render graph 480, such as nodes associated with content segments that function to transition between scenes (e.g., a black screen), nodes associated with content segments including a cast run (e.g., the names of the director, producer, actors, etc.), nodes associated with content segments including a logo or graphic of a production company or distributor, etc. The pointer modification component 460 may be configured to insert the new nodes 482 and 484 into the content render graph 480 based up parameters inputted by the user. Additionally, as described above, the pointer modification component 460 may be configured to add and/or delete edges of the content render graph 480 to rearrange nodes of the content render graph 480 and to omit nodes of the content render graph 480 (e.g., to shorten the movie to a suitable length for a trailer).

Further, in certain embodiments, the pointer modification component 460 may be configured to merge or synchronize one or more coordinated content render graphs 486 with the content render graph 480 and/or the master version of the content render graph 452. For example, synchronizing the coordinated content render graph 486 with the content render graph 480 may be desirable to overlay audio content, or any other desired digital content, with the content segments of the content render graph 480. In one embodiment, the coordinated content render graph 486 may include content segments including a voice-over narration and/or music (e.g., a portion of a score).

Figure 22:
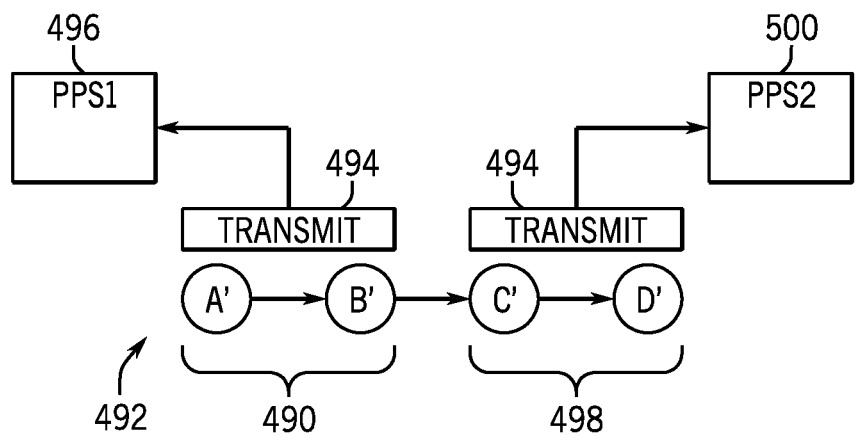
FIG. 22 is a diagrammatical representation of a content render graph for managing access to content.

As noted above, selected content segments may be transmitted to an editing/post-production company for editing, rather than the complete, master content file. This may be desirable to decrease the amount of content that is transmitted and to increase the access control of the content. For example, as illustrated in FIG. 22, a first set of content segments 490 of a master content file 492 may be transmitted (e.g., by transmit component 494) to a first post-production system 496. It should be noted that any number of content segments of the master content file 492 may be transmitted to a post-production system. Furthermore, while the illustrated first set of content segments 490 includes sequential content segments, in other embodiments, non-sequential content segments may also be transmitted by the transmit component 494. Additionally, a second set of content segments 498 may be transmitted (e.g., by the transmit component 494 or another transmit component) to a second post-production system 500.

Figure 23:
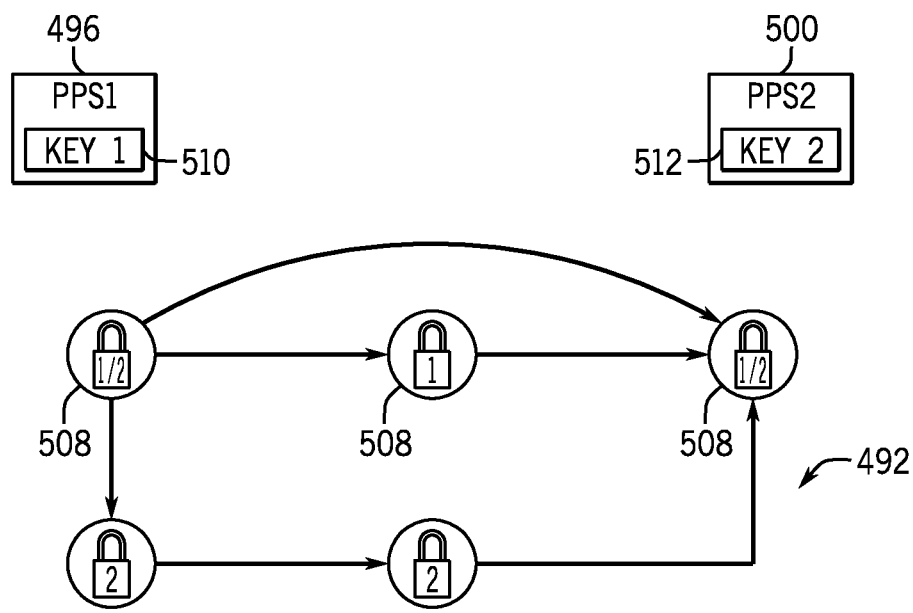
FIG. 23 is a diagrammatical representation of a content render graph for managing access to content.

In other embodiments, an encrypted version of the master content file 492 may be transmitted to an editing/post-production company along with a key management scheme, which may enable the editing/post-production company to only access the content segments to be edited (e.g., the segments they have decryption keys for). For example, as illustrated in FIG. 23, the master content file 492 includes encrypted content segments 508, which is graphically represented by the lock symbol. The illustrated embodiment of the master content file 492 includes two levels of encryption. For example, the content segments 508 may be encrypted using a first DRM encryption scheme (e.g., a first set of DRM rights) and/or a second DRM encryption scheme (e.g., a second set of DRM rights). As illustrated, the content segments 508 including a lock labeled "1" may be encrypted using the first DRM encryption scheme, the content segments including a lock labeled "2" may be encrypted using the second DRM encryption scheme, and the content segments including a lock labeled "1/2" may be encrypted using both DRM encryption schemes. The first post-production system 496 may include a first key management scheme 510, which may be configured to decode the first DRM encryption scheme. The second post-production system 500 may include a second key management scheme 512, which may be configured to decode the second DRM encryption scheme. Accordingly, each of the post-production systems 496 and 500 can only access the segments that their keys 510 and 512, respectively, will decrypt.

Alternatively, the master content file 492 may be transmitted to the post-production systems 496 and 500 along with an encrypted content render graph. That is, rather than encrypting the content segments of the master content file, the nodes and/or edges of the content render graph may be encrypted. Thus, the key management schemes provided to the post-production companies may be configured to decode the nodes of the content render graph to access the content segments associated with the respective nodes. Additionally, it should be noted that the present techniques for encrypting content segments and/or nodes may be extended to other scenarios and are not restricted to use with post-production companies. For example, an individual may apply the encryption techniques to a personal content file (e.g., a movie owned by the individual) to prevent copying of the content file and/or to prevent access to particular content segments of the content file.

Figure 24:
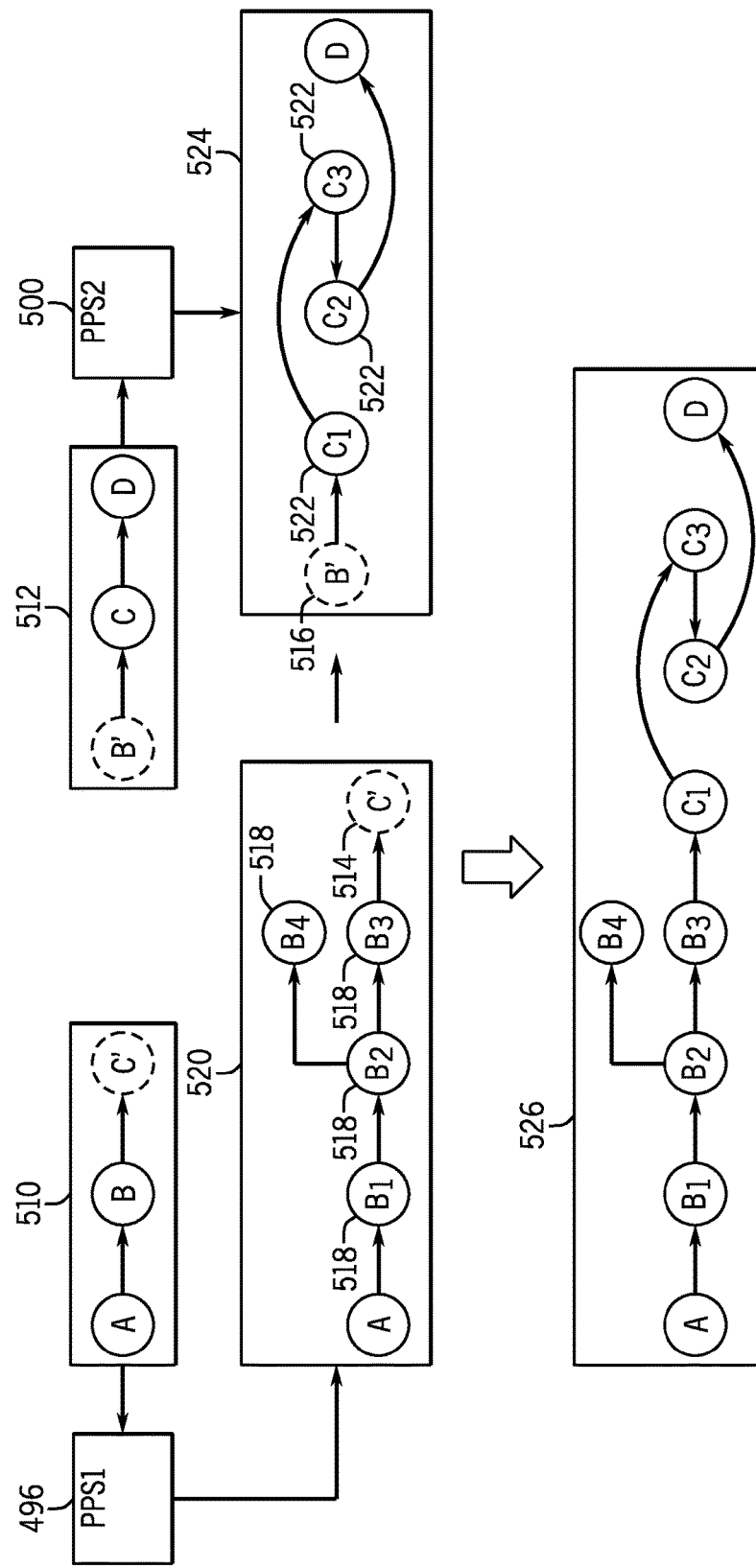
FIG. 24 is a diagrammatical representation of a content render graph for editing content.

In some embodiments, the editing/post-production company (e.g., the first post-production system 496 and/or the second post-production system 500) may alter the content render graph transmitted to the editing/post-production company during the editing process. Further, in some embodiments, the editing process may change the fingerprint of one or more content segments in the content render graph. For example, adding visual effects to a content segment may alter the fingerprint of the content segment. Accordingly, the post-production systems 496 and 500 may be configured to create new nodes based at least in part upon the new fingerprints of the content segments and to adjust the content render graph based at least in part upon the new nodes. In some embodiments, the post-production systems 496 and 500 may include a fingerprint algorithm, such as the fingerprint algorithm 76 of FIG. 2, to analyze the content segments to determine the fingerprints. In other embodiments, the post-production systems 496 and 500 may be configured to use a subscription service or another processing device to determine the new fingerprints. For example, as illustrated in FIG. 24, the first post-production system 496 may receive a first content render graph 510, and the second post-production system 500 may receive a second content render graph 512. The first and second content render graphs 510 and 512 may be transmitted to the respective post-production systems using the techniques described above with respect to FIGS. 22 and 23. As illustrated, the first content render graph 510 includes two nodes (node A and node B) and includes a reference node 514 (node C). The reference node 514 (e.g., link point) may reference a node of the second content render graph 512 to facilitate the merging of the first and second content render graphs 510 and 512 after the editing process. Similarly, the second content render graph 512 includes two nodes (node C and node D) and includes a reference node 516 (node B), which may reference a node of the second content render graph 512.

As noted above, the post-production systems 496 and 500 may edit the content, which may alter the fingerprint of one or more content segments of the content render graphs, and may generate new nodes based on the altered fingerprints. For example, the post-production system 496 may be configured to generate new nodes 518 (node B1, node B2, node B3, and node B4), which may replace one or more nodes of the content render graph 510. The post-production system 496 may also create a new content render graph 520 incorporating the new nodes 518. Similarly, the post-production system 500 may generate new nodes 522 (node C1, node C2, and node C3), which may replace one or more nodes of the content render graph 512. Additionally, the post-production system 496 may create a new content render graph 524 incorporating the new nodes 522.

In some embodiments, after the post-production systems 496 and 500 have edited the content, the new content render graphs 520 and 524 may be merged (e.g., compiled) into a merged content render graph 526. Any suitable processing circuitry or processing device may be used to receive and merge the content render graphs 520 and 524 using any suitable algorithm. For example, in some embodiments, a production system may be configured to receive and merge the content render graphs 520 and 524. Additionally, the system may be configured to use the reference nodes 514 and 516 to merge the content render graphs 520 and 524. In some embodiments, the post-production systems 496 and 500 may be configured to maintain a list of edits (e.g., modifications) to the respective content render graph, which may facilitate the merging of the content render graphs. Additionally or alternatively, a production system may record contextual information relating to the position of the content render graphs 510 and 512 relative to the master content render graph, which may facilitate the merging of the content render graphs. For example, the production system may record the contextual information at the point of transmission (e.g., when the content render graph 510 is transmitted to the first post-production system 496) and/or at the point of return (e.g., when the content render graph 510 is transmitted back to the production system).

As described above, the present techniques utilize fingerprint-defined segment-based content and identifiers associated with the fingerprints of the content segments to edit the content and to control access to the content. For example, multiple edited versions of the content and/or additional content (e.g., trailers, highlights, content summaries) may be created by constructing different content segment sequencing representations, while a master content version may remain unmodified. This may increase storage efficiency of the system. Additionally, segmenting the content may provide increased access control over the content by enabling only selected content segments to be accessed by particular entities.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for editing a piece of digital content, comprising:
   using a processor-based device to:
      read a content segment sequencing representation comprising a plurality of ordered sequences of a plurality of linked nodes, wherein each of the plurality of ordered sequences comprise at least one common node with another ordered sequence of the content segment sequencing representation and each of the plurality of ordered sequences defines one version of a plurality of versions of the piece of digital content, by defining a corresponding playback order of a plurality of content segments that make up the piece of digital content, based upon a corresponding ordered sequence of nodes that are associated with the plurality of content segments;
      wherein each node of the plurality of linked nodes is associated with a respective content segment of the plurality of content segments;
      wherein each content segment of the plurality of content segments comprises an equal number of frames of the piece of digital content, wherein the equal number of frames is defined by a predetermined frame resolution rate;
      receive a user input, business logic, or a combination there-of;
      select a particular one of the plurality of ordered sequences based upon the user input, the business logic, or the combination thereof; and cause playback of a version of the piece of digital content, using a playback order of the plurality of content segments that corresponds to the selected particular one of the plurality of ordered sequences.

2. The method of claim 1, wherein the user input causes a pointer modification that alters the particular one of the plurality of ordered sequences.

3. The method of claim 2, wherein the pointer modification comprises inputting one or more new nodes into the selected particular one of the plurality of ordered sequences.

4. The method of claim 2, wherein the pointer modification comprises removing one or more nodes from the selected particular one of the plurality of ordered sequences.

5. The method of claim 1, comprising generation of a new digital content file based the upon particular one of the plurality of ordered sequences.

6. The method of claim 5, wherein the new digital content file comprises a trailer, a promotion, an advertisement, or a content summary.

7. The method of claim 1, wherein the user input comprises a data encryption scheme configured to encrypt one or more nodes of the plurality of linked nodes.

8. The method of claim 1, wherein each node of the plurality of linked nodes is associated with an identifier that uniquely identifies a respective content segment of the plurality of content segments, and wherein each identifier is based at least in part upon a fingerprint of the respective content segment.

9. The method of claim 8, wherein the user input comprises an edit to a content segment of the plurality of content segments, and wherein the edit alters the fingerprint of the edited content segment.

10. The method of claim 9, further comprising:
using the processor-based device to:
determine a new identifier for the edited content segment based at least in part upon the altered fingerprint;
associate the new identifier with the edited content segment; and
associate a new node with the new identifier; and
wherein generating the second version of the content segment sequencing representation comprises replacing a node associated with the edited content segment with the new node.

11. A system for editing a piece of digital content, comprising:
a content manager comprising data processing circuitry configured to:
receive a first content segment sequencing representation from a first content editor, wherein the first content segment sequencing representation comprises an edited version of a first portion of a master content segment sequencing representation;
wherein the master content segment sequencing representation comprises a plurality of ordered sequences of a plurality of linked nodes, wherein each of the plurality of ordered sequences comprise at least one common node with another ordered sequence of the content segment sequencing representation and each of the plurality of ordered sequences defines one version of a plurality of versions of the piece of digital content, by defining a corresponding playback order of a plurality of content segments that make up the piece of digital content, based upon a corresponding ordered sequence of nodes that are associated with the plurality of content segments;
wherein each node of the plurality of linked nodes is associated with a respective content segment of the plurality of content segments;
wherein the first content segment sequencing representation comprises a first reference node that references a first node of the plurality of linked nodes of the master content segment sequencing representation; and
wherein each content segment of the plurality of content segments is created by segmenting the piece of digital content into the plurality of content segments using a predetermined frame resolution rate; and
merge the first content segment sequencing representation with the master content segment sequencing representation using the first reference node and the first node of the plurality of linked nodes to generate a merged version of the piece of digital content.

12. The system of claim 11, wherein the data processing circuitry is configured to:
receive a second content segment sequencing representation from a second content editor, wherein the second content segment sequencing representation comprises an edited version of a second portion of the master content segment sequencing representation, and
wherein the second content segment sequencing representation comprises a second reference node that references a second node of the linked plurality of nodes of the master content segment sequencing representation; and
merge the second content segment sequencing representation with the first content segment sequencing representation and the master content segment sequencing representation using the second reference node and the second node of the linked plurality of nodes.

13. The system of claim 12, wherein the data processing circuitry is configured to generate a new content segment sequencing representation based at least in part upon the first and the second content segment sequencing representations, wherein the first content segment sequencing representation replaces the first portion of the master content segment sequencing representation in the new content segment sequencing representation and the second content segment sequencing representation replaces the second portion of the content segment sequencing representation in the new content segment sequencing representation.

14. The system of claim 11, wherein data processing circuitry is configured to replace the first portion of the master content segment sequencing representation with the first content segment sequencing representation to merge the first content segment sequencing representation with the master content segment sequencing representation.

15. The system of claim 11, wherein each node of the plurality of linked nodes is associated with an identifier uniquely identifies a respective content segment of the plurality of content segments, and wherein each identifier is based at least in part upon a fingerprint of the respective content segment.

16. The system of claim 15, wherein the first content segment sequencing representation comprises at least one new identifier that uniquely identifies an edited content segment.

17. A tangible, non-transitory computer-readable medium comprising executable code for:
obtaining a content segment sequencing representation comprising a plurality of ordered sequences of a plurality of linked nodes, wherein each of the plurality of ordered sequences comprise at least one common node with another ordered sequence of the content segment sequencing representation and each of the plurality of ordered sequences defines one version of a plurality of versions of a piece of digital content, by defining a corresponding playback order of a plurality of content segments that make up the piece of digital content, based upon a corresponding ordered sequence of nodes that are associated with the plurality of content segments;

wherein each node of the plurality of linked nodes is associated with a respective content segment of the plurality of content segments;

wherein each content segment of the plurality of content segments comprises an equal number of frames of the piece of digital content, wherein the equal number of frames is defined by a predetermined frame resolution rate;

encrypting one or more nodes of the plurality of linked nodes using a first data encryption scheme such that a first subset of the plurality of linked nodes is encrypted via the first data encryption scheme and a second subset of the plurality of linked nodes is not encrypted via the first data encryption scheme;

enabling editing of the piece of digital content associated with the first subset of the plurality of linked nodes only with a first decryption key of the first data encryption scheme;

receiving a user input, business logic, or a combination thereof;

selecting a particular one of the plurality of ordered sequences based upon the user input, the business logic, or the combination thereof; and causing playback of a version of the piece of digital content, using a playback order of the plurality of content segments that corresponds to the selected particular one of the plurality of ordered sequences.

18. The computer-readable medium of claim 17, comprising executable code for transmitting the content segment sequencing representation, a content file associated with the piece of digital content, and the first data encryption scheme to a first content editor.

\* \* \* \* \*